United States Patent [19]

Colson et al.

[11] Patent Number: 5,394,922
[45] Date of Patent: Mar. 7, 1995

[54] FABRIC LIGHT CONTROL WINDOW COVERING

[75] Inventors: Wendell B. Colson; Paul G. Swiszcz, both of Boulder, Colo.

[73] Assignee: Hunter Douglas Inc., Upper Saddle River, N.J.

[21] Appl. No.: 866,070

[22] Filed: Apr. 13, 1992

Related U.S. Application Data

[63] Continuation-in-part of Ser. No. 701,165, May 17, 1991, Pat. No. 5,313,999, which is a continuation-in-part of Ser. No. 602,998, Oct. 24, 1990, abandoned.

[51] Int. Cl.$^6$ ................................................ E06B 9/08
[52] U.S. Cl. ........................... 160/121.1; 160/DIG. 7
[58] Field of Search .............. 160/121.1, 84.1, 166.1, 160/89, 236, DIG. 7; 156/65; 427/176, 173, 172

[56] References Cited

U.S. PATENT DOCUMENTS

| | | |
|---|---|---|
| Re. 30,254 | 4/1980 | Rasmussen . |
| 1,937,342 | 11/1933 | Higbie . |
| 2,029,675 | 2/1936 | Schlamp . |
| 2,110,145 | 3/1938 | Loehr . |
| 2,140,049 | 12/1938 | Grauel . |
| 2,267,869 | 12/1941 | Loehr . |
| 2,571,372 | 10/1951 | Martin ............................ 156/65 X |
| 2,620,850 | 12/1952 | Janowski . |
| 2,620,869 | 12/1952 | Friedman .......................... 160/236 |
| 2,688,356 | 9/1954 | Conti . |
| 2,822,840 | 2/1958 | Reynolds et al. . |
| 2,865,446 | 12/1958 | Cole . |
| 2,914,122 | 11/1959 | Pinto . |
| 3,384,519 | 5/1968 | Froget . |
| 3,540,975 | 11/1970 | Wright et al. . |
| 3,661,665 | 5/1972 | Froget . |
| 3,701,376 | 10/1972 | Froget . |
| 4,009,626 | 3/1977 | Gressman . |
| 4,019,554 | 4/1977 | Rasmussen . |
| 4,039,019 | 8/1977 | Hopper . |
| 4,052,521 | 10/1977 | Ferrari ............................ 427/176 X |
| 4,194,550 | 3/1980 | Hopper . |
| 4,309,472 | 1/1982 | Gotting et al. ................. 160/236 X |
| 4,344,474 | 8/1982 | Berman . |
| 4,377,431 | 3/1983 | Chodosh . |
| 4,386,454 | 6/1983 | Hopper . |
| 4,397,704 | 8/1983 | Frick . |
| 4,732,630 | 3/1988 | Schnebly . |
| 4,815,581 | 3/1989 | Deutschlander . |
| 4,826,555 | 5/1989 | Long . |
| 4,884,612 | 12/1989 | Schnebly et al. ................. 160/84.1 |
| 4,885,190 | 12/1989 | Schnebly . |
| 4,895,611 | 1/1990 | Bryniarski et al. . |
| 4,909,870 | 3/1990 | Gould et al. . |
| 4,948,445 | 8/1990 | Hees . |
| 5,106,444 | 4/1992 | Corey et al. ..................... 160/84.1 |

FOREIGN PATENT DOCUMENTS

| | | |
|---|---|---|
| 249985 | 5/1961 | Australia . |
| 672993 | 3/1966 | Belgium . |
| 294442 | 11/1984 | European Pat. Off. . |
| 0482793 | 4/1992 | European Pat. Off. . |
| 1166398 | 2/1957 | France . |
| 1309194 | 7/1961 | France . |

(List continued on next page.)

Primary Examiner—David M. Purol
Attorney, Agent, or Firm—Gary M. Polumbus

[57] ABSTRACT

A window covering includes at least one piece of sheer material and a spaced but parallel support system in the form of a second sheet of sheer material, strips of similar material or strings, with a plurality of spaced flexible vanes extending therebetween. The vanes are attached to at least the sheer sheet of material by an adhesive line that penetrates the sheer material so as to protrude through an opposite side thereof and encapsulate the fibers of the sheer material. The surface of the adhesive on the opposite side of the sheer material from the vane is roughened to create a dull appearance. Strips of fabric material which can be used as vanes are also disclosed as being formable from elongated strips of material which are lengthwise tensioned prior to applying a bonding composition to the material so as to render the strip of material more stiff in its lengthwise direction than in a cross direction.

85 Claims, 11 Drawing Sheets

FOREIGN PATENT DOCUMENTS

| | | |
|---|---|---|
| 1364674 | 5/1963 | France . |
| 1373515 | 4/1964 | France . |
| 1465261 | 1/1966 | France . |
| 1480262 | 3/1966 | France . |
| 1381472 | 11/1966 | France . |
| 1526507 | 6/1967 | France . |
| 1585159 | 4/1968 | France . |
| 2095034 | 2/1972 | France . |
| 2180260 | 11/1973 | France . |
| 2398170 | 2/1979 | France . |
| 122088 | 4/1900 | Germany . |
| 382758 | 10/1923 | Germany . |
| 684202 | 11/1939 | Germany . |
| 1241361 | 5/1967 | Germany . |
| 1942674 | 10/1970 | Germany . |
| 7008554 | 10/1970 | Germany . |
| 2735654 | 2/1979 | Germany . |
| 2923233 | 12/1980 | Germany . |
| 2936811 | 4/1981 | Germany . |
| 3525515 | 1/1987 | Germany . |
| 8906284 | 9/1989 | Germany . |
| 7805464 | 10/1978 | Netherlands . |
| 331432 | 7/1958 | Switzerland . |
| 423207 | 4/1967 | Switzerland . |
| 476482 | 9/1969 | Switzerland . |
| 494338 | 9/1970 | Switzerland . |
| 951484 | 3/1964 | United Kingdom . |
| 1036126 | 7/1966 | United Kingdom . |
| 1116934 | 6/1968 | United Kingdom . |
| 1228677 | 4/1971 | United Kingdom . |
| WO8002712 | 12/1971 | WIPO . |

FABRIC LIGHT CONTROL WINDOW COVERING

CROSS-REFERENCE TO RELATED APPLICATIONS

This application is a continuation-in-part of application Ser. No. 07/701,165, filed May 17, 1991, now U.S. Pat. No. 5,313,999, which is a continuation-in-part application of Ser. No. 07/602,998, filed Oct. 24, 1990, now abandoned.

FIELD OF INVENTION

The present invention relates to methods and apparatus for making window coverings and, more particularly, to improved fabric window coverings provided with adjustable vanes for controlling the amount of light passing therethrough.

BACKGROUND OF THE INVENTION

Fabric window coverings are often preferred by consumers for a number of their features. The features most often considered desirable are the softer appearance relative to traditional venetian blinds, the uniform appearance which they provide a window, and the insulating properties associated with cellular fabric shades.

U.S. Pat. No. 3,384,519 to Froget discloses one such attempt. The window covering disclosed therein consists of two cloth layers spaced apart by movable parallel blades having each of their marginal edges heat-welded to one of the movable cloth layers. With this window covering, relative movement of the two cloth layers in a direction perpendicular to the blades changes the angle of the blade and thus controls the amount of light admitted through the article. A number of undesirable features of the Froget window covering derive from the fact that it is constructed utilizing a heat-welding process. First, the process is limited to use of fabrics which may be heat welded, i.e. certain mutually compatible thermoplastic materials. Also heat-welding necessarily requires a melting of at least some of the fibers of the materials bonded. Because some of the fibers are melted, the fabric structures are weakened. Also it creates an uneven outer appearance along the heat-welds and producing unwanted crimps or creases in the materials, which can result in fatigue failure. Further, heat-welding is a relatively slow process which may require six or more seconds to create a bond over an extended length. This is too slow for high volume commercial production processes. Other drawback of the Froget window covering is the difficulty in achieving uniformly straight heat welded joints over an extended length.

In an earlier filed application entitled Fabric Light Controlled Window Covering Ser. No. 07/701,165 filed May 17, 1991, is disclosed a fabric light control window covering that comprises a first sheer fabric sheet, a second sheer fabric sheet disposed parallel to the first sheet, and a plurality of relatively opaque fabric strips adhesively bonded transversely between the sheet fabrics. Each strip has an edge portion bonded to the first sheet and an opposite edge portion bonded to the second sheet in a manner tending to bias the first and second sheets together. The window covering is movable between a closed position and an open position. The closed position is characterized by a central portion of the fabric strips being substantially parallel to the first and second sheer fabric sheets with the strips themselves being substantially planar. The open position is characterized by the central portion of the fabric strips being substantially perpendicular to the first and second fabric sheets and to the bonded edge portions of the strips themselves. Also, characteristic of this position is that portions of the strips between the bonded edge portions and central portions form smoothly curving surfaces which are free of creases or sharp fold.

The method for manufacturing such a window covering generally includes the following steps. A first line of hot-melt adhesive is applied to the narrow strip material adjacent one edge on one side. A second line of hot-melt adhesive is applied to the narrow strip material adjacent the opposite edge on the opposite side. The narrow strip material is then cut to lengths equal to the width of the wider sheet fabrics and the cut lengths are separated to provide a space between them sufficient to allow for a subsequent processing step. The first sheer fabric is fed at a constant rate longitudinally in a direction perpendicular to the longitudinal direction of the cut strips. The first sheer fabric is also fed over the cut strips in close proximity thereto. As the first sheer fabric is fed, a portion is preheated to a temperature sufficient to form a tack bond with the hot-melt adhesive. Then, while continuously feeding the first sheer fabric at a constant rate, a portion of the first sheer fabric is stopped directly over one of the cut strips so that the cut strip may be pressed and bonded to the first sheer fabric without smearing the adhesive. In order to move the bonded strips out of the way of the next strip, the stopped portion of the first sheer fabric is advanced in machine direction, followed by a backward step to position the first sheer fabric for application of the next cut strip in an overlaying relationship to the previously applied cut strip. The second sheer fabric is then fed into mating contact with the cut strips which have been bonded to the first sheer fabric completing the compilation or collation, thereby forming a sandwich of three layers. Almost immediately after feeding the second sheer fabric, the sandwich or compilation is heated under uniform pressure and tension to melt and force the hot-melt adhesive into the sheer fabrics, and set the layers of the sandwich at a uniform temperature-size relationship. Finally, the fabric sandwich is cooled under uniform pressure and tension, thereby permanently bonding the sheer fabrics to the cut strips without creating warps or wrinkles. All three fabrics are, therefore, heat set and will stay in perfect size relationship to one another. Moreover, the product will be essentially wrinkle-free at any use temperatures. The final, permanently bonded fabric can then be cut to desired lateral widths and/or trimmed along the lateral edges thereof.

SUMMARY OF INVENTION

The present invention provides improved window coverings of the type described above, and an improved apparatus and improved methods for making same. This is accomplished by a window covering that has an improved appearance, improved strength and improved flexibility. Improved apparatus and improved methods utilizing unique IR bonding techniques and compilation techniques cooperate to produce superior and improved window coverings.

BRIEF DESCRIPTION OF THE DRAWINGS

The features and advantages of the present invention will be more readily apparent from the following detailed description of the preferred embodiments, illustrated in the drawing figures wherein.

DETAILED DESCRIPTION OF PREFERRED EMBODIMENTS

Figure 1:
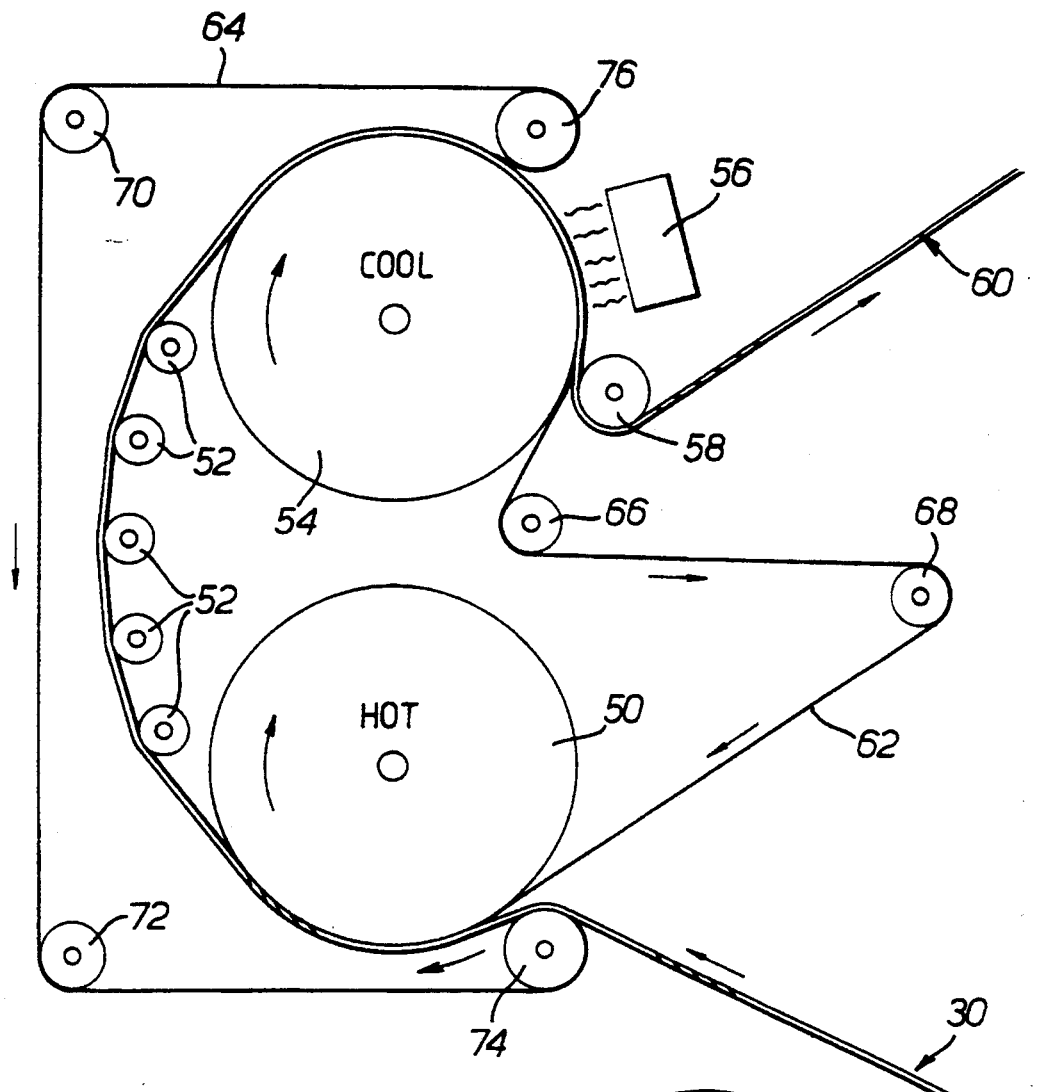
FIG. 1 is a side elevation view in schematic form showing improved apparatus for bonding a compiled fabric according to the present invention.
Figure 1A:
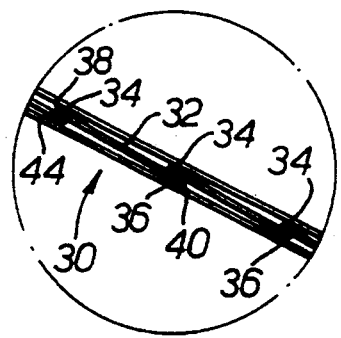
Figure 13:
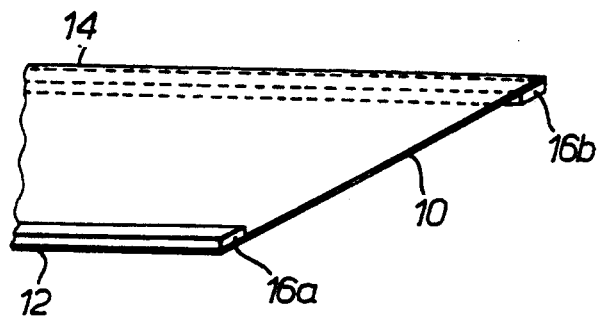
FIG. 13 is a schematic view showing a vane with glue lines along opposed edges.

Referring now to the drawings in detail, FIG. 1 shows improvements to the apparatus and method currently in use to make a window covering consisting of a pair of sheers to which are fixed (by gluing) a plurality of overlapping vanes. As a first stage, a series of vanes 10, See FIG. 13, are provided with glue lines 16a, 16b (16a leading in the machine direction) along their opposed long edges but on opposite sides. The vanes 10 are tack bonded to a sheer 20 being continuously unwound from a supply roll. The vanes 10 are successively tack bonded in overlapping fashion to the sheer along their leading edges using an air jet to keep the last tack bonded vane 10 hanging down and away from the area of the next tack bonded vane 10. Then a compilation 30 is made with a second sheer 19 being supplied from a second supply roll, see FIG. 15. The compilation 30 then passes through a bonding process to obtain the window covering in bulk, see FIG. 15.

As illustrated in FIG. 13, adhesive line 16a is disposed on vane material 10 adjacent one edge 12 (the leading edge 12 in the machine direction) and on one side or face of the material, as shown, the top face or side. A second adhesive line 16b is disposed adjacent the opposite edge 14 (the trailing edge in the machine direction) on the opposite face or side of the material as shown, the bottom face or side. The two adhesive lines 16a and 16b are placed on the vane material 10 by utilizing apparatus and methods as will be described hereinafter.

In a preferred embodiment of the present invention, the adhesive used is a copolyester hot-melt adhesive. This adhesive melts and flows at about 350° F. and provides excellent strength over the temperature range to which the window covering will be exposed in use. It also provides a tack bond at slightly lower temperatures around 220° F. which is useful in subsequent steps as described below.

This type of adhesive however does have the undesirable characteristic of yellowing when heated and maintained in a melted state for extended periods of time. In order to prevent yellowing, it is necessary to heat only a small amount of adhesive at a time.

Figure 15:
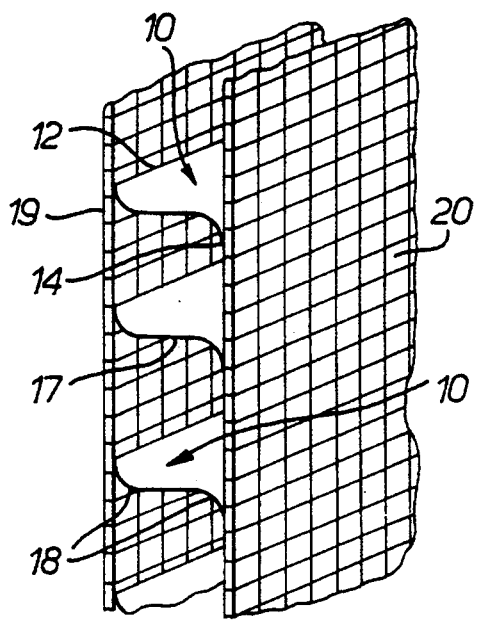
FIG. 15 is a perspective view of a window covering made according to the present invention.

FIG. 15 illustrates the window covering material in a fully open, light admitting position. In this position, each vane 10 has a central portion 17 which is substantially perpendicular to first and second sheer fabrics 20, 19. Edge portions 12, 14 of the vane 10, which are bonded to the sheer fabrics are connected to central portion 17 by portions 18 having a smoothly curving shape. The adhesive bonding process of the present invention allows portions 18 to be formed without creases or sharp folds. The smoothly curved nature of these portions, in the fully open position, allows the vane to retain its resiliency and thus tends to bias the sheer fabrics 20, 19 into a closed or drawn together position. This ensures that the window covering does not lose its shape over time from repeated opening and closing. Furthermore, creases along vanes 10 can develop into failure points due to repeated bending inherent in the opening and closing of the window covering.

FIG. 15 also illustrate a technique employed for avoiding the appearance of a moire effect in window coverings of this type. With such window coverings, sheer woven fabrics having small interstices between the fibers provide a pleasant and desirable appearance for the first and second sheer fabrics 20, 19. However, when the same or very similar material of this type is used for the first and second sheer fabrics, a moire pattern is created by the fabrics when viewed in overlaying relationship due to light interference effects. This moire effect is eliminated in the present invention by providing for the first and second sheers woven and preferably knit fabrics of materials having differently sized, shaped and/or oriented interstices. According to the present invention, the moire effect is also avoided by using a nonwoven sheer material as one or both of the first and second fabrics or by using a transparent plastic material as one or both of the first and second fabrics.

To avoid the undesirable moire effect when the first and second sheers of woven or knit material are viewed in overlaying relation in the window covering of the present invention, the first and second sheers must have different appearances when the sheer panels are viewed along an axis perpendicular to the plane of the first sheer 20 and perpendicular to the plane of the second sheer 19. The required difference in appearance between the first sheer 20 and the second sheer 19 can be achieved in several different ways.

The first sheer 20 can be a woven or knit fabric having interstices of one shape and the second sheer 19 can be a woven or knit material having interstices of a second shape. For example, a woven fabric employing fibers forming small square interstices is used as the second sheer 19 and a material is used for the first sheer 20 that may have fibers forming interstices which are smaller, the same size or larger than those of the second sheer fabric 19. However, the threads of the first sheer 20 run at approximately 45° angle (30°-60°) with respect to the thread of the second sheer 19. For example, the threads of the first sheer run diagonally, forming diamonds, whereas the threads of the second sheer run orthogonally forming squares. With this relationship between first and second sheers, the appearance of a moire pattern can be avoided.

In another embodiment, the first sheer 20 can be a woven or knit fabric having interstices of one shape and size and the second sheer 19 can be a woven or knit fabric having interstices of the same shape as the first sheer fabric but of a different size. In this second embodiment, shown in FIG. 15, the moire pattern may be avoided by providing a second sheer 19 which has interstices which are smaller than those of first sheer 20 without regard to the relative orientation or shape of the interstices. This also prevents the occurrence of interference effects leading to a moire effect. In practice, the first and second sheers are selected so that the width of the interstices of the first sheer 20 is far greater than the width of the interstices of the second sheer 19, thereby avoiding the moire effect. For example, the threads of the second sheer are so small so that they cannot discern as individual threads. While the threads of the first sheer are larger.

Also, moire effect can be eliminated by using thread spacing so small that one's eye cannot discern individual threads for the second sheer and use with a fabric for the first sheer in which has a larger thread spacing. It is also possible to use the same woven or knitted fabric for both the first and second sheers 20, 19, provided that the woven fabric is oriented differently in the two sheers in order to provide the required difference in appearance. For example, the woven fabric of second sheer 19 can have square interstices, and the same woven fabric having square interstices can be used as the woven fabric of the first sheet 20 by changing the orientation of the woven fabric by 45° to provide the diamond shaped interstices of the first sheer 20. When the same woven fabric is used for both the first and second sheers, the fabric for one of the sheets is cut on the bias so that the orientation of the interstices of that fabric is changed by an angular amount, e.g. roughly 45°, 60° or 90°, sufficient to provide the required difference in appearance when the first and second sheers are viewed along an axis perpendicular to the plane of both.

It is also possible to avoid the moire effect and provide the required difference in appearance by using a nonwoven sheer material, such as a plastic material, for one of the sheers and a woven material for the other of the sheers of the window covering. Alternatively, nonwoven sheer materials, such as the same or different plastic materials, can be used for both the first and second sheers. A transparent plastic material can also be used as the first and/or second fabric. The use of a transparent material as at least one of the first and second fabrics also avoids the moire effect.

Figure 18:
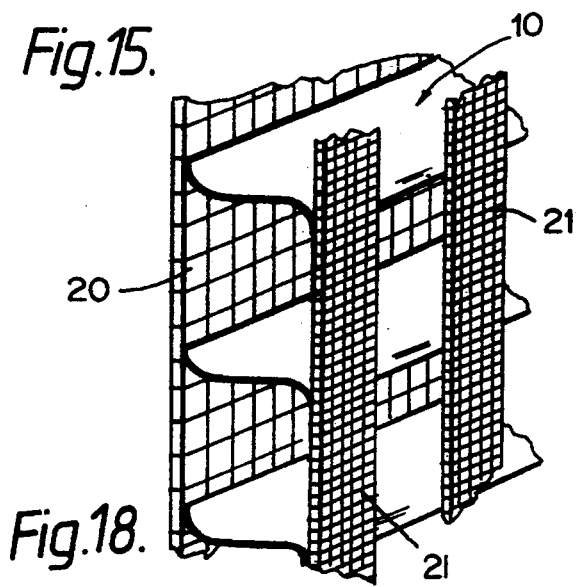
FIG. 18 is a perspective view of a window covering made in accordance with an alternative embodiment to that illustrated in FIG. 15.

In another embodiment of the present invention shown in FIG. 18, the second sheer 19 is replaced by a series of elongated elements which may be in the form of sheer fabric strips 21 or a series of strings. A window covering of this embodiment can be made by the same process and apparatus as described herein, however a series of parallel sheer fabric strips or parallel strings are fed to the apparatus from an appropriate supply roll instead of a second sheer 19. The use of a series of strings or sheer fabric strips in place of the second sheer fabric 19 provides a more "seethrough" effect when the window covering is in the open position. However, because the overlapping configuration of the vanes is the same as that of a window covering having a second sheer 19, in the closed position a window covering comprising a plurality of strings or sheer fabric strips provides the same light blocking effect the physical appearance of the fabric strips 21 and the sheer 19 can be varied as described above to avoid the moire effect.

To achieve the gently curved structure of the vanes 10 shown in FIG. 15, the vane material must have a certain degree of softness. As a general principle, the wider the vanes 10, the stiffer the vane material can be. However, since a broad range of vane widths may be employed in window coverings in accordance with the present invention, it is difficult to precisely define an acceptable softness or stiffness range for the vane material.

A simple and effective physical test has been devised to determine whether a particular fabric is suitable for vanes having a specific vane width. The fabric being tested is allowed to hang over the edge of a table such that the distance from the edge of the fabric to the table top equals the desired vane width. If this length of fabric hangs substantially vertically, then it has sufficient softness for a vane of that vane width. For example, if a fabric is being tested for use as a 2" wide vane, the edge of the fabric is extended 2" beyond the edge of the table. If the extended 2" of the fabric hangs substantially vertically from the table edge, it is suitable for use as a 2" wide van material in the structure shown in FIG. 15. If the extended 2" of the fabric does not hang substantially vertically, the fabric is too stiff to produce 2" wide vanes having the gently curved appearance of FIG. 15.

Figure 16:
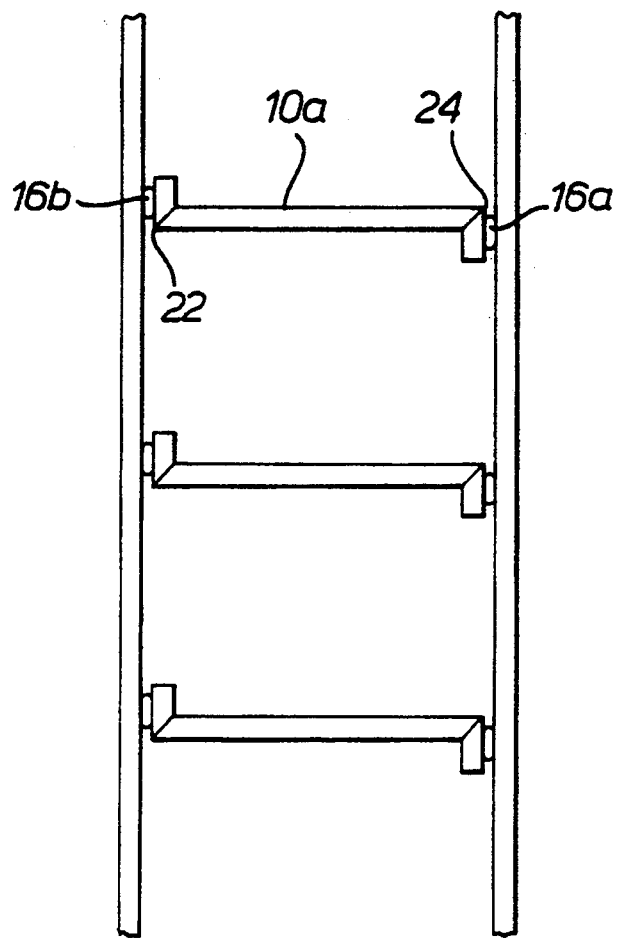
FIG. 16 is a schematic view showing a window covering made according to the invention with special hinge points.
Figure 17:
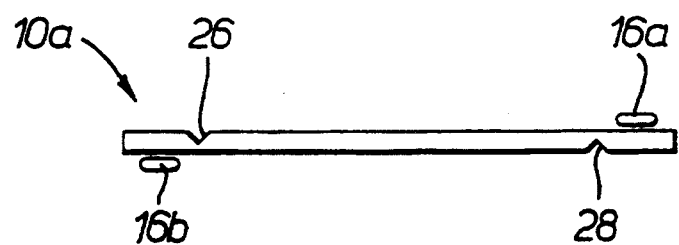
FIG. 17 is a schematic view showing a vane with glue lines and hinge points as incorporated in the assembly of FIG. 16.

Stiffer fabrics, i.e., those which do not hang substantially vertically over a table edge at the length of the desired vane width, can also be used as the vane material. However, if a stiffer fabric is used for the vanes, longitudinally extending hinge or flex points must be provided along the edges of the vanes. The use of a stiffer fabric provided with hinge points produces a window covering having a somewhat different appearance than the window covering shown in FIG. 15. This second embodiment of a window covering is shown in FIGS. 16 and 17. As seen in FIG. 16, vanes 10a have a straighter appearance and have a sharp bend at the hinge points 22 and 24, rather than a gently curving portion 18 as shown in FIG. 15. The hinge points 22, 24 are provided by score-compressing a stiff vane material, parallel to the longitudinal edges of the vane material. The score-compressed lines 26, 28 formed in the stiff vane material are spaced apart from the longitudinal edge of the vane material a distance sufficient to allow the adhesive lines 16a, 16b to be applied to the vane material between the longitudinal edge of the vane material and the score-compressed line.

A structure similar to that shown in FIG. 16 can also be produced using a relatively soft vane material, if desired. In this embodiment, a stiffening agent is printed on the vane material in the central portion thereof to provide flatter vanes. The longitudinal edges of the vane material are left free of stiffening agent and the required hinge points are formed at the longitudinally extending edges of the printed on stiffening agent. The adhesive lines are applied to the longitudinal edges of the vane material, which longitudinal edges have been left free of stiffening agent.

According to another embodiment of the present invention, the vanes are formed of a black-out laminate material to maximize the room darkening effect of the window covering when the vanes are oriented in the closed position. A suitable black-out laminate material is a three ply laminate comprising a polyester film such as MYLAR sandwiched between two layers of a spun bonded or spun laced polyester nonwoven material. Black-out laminates of this type are generally known in the art and have previously been used in other types of window coverings. Such a three ply laminate has, by virtue of its construction, a greater stiffness than most single ply materials. Accordingly, score-compressed hinge points, such as those shown in FIG. 17, could be provided in the black-out laminate vane material if necessary.

Alternatively, to produce a window covering of the present invention having a maximized room darkening effect, only a stiffened central portion of the vanes is formed from a black-out laminate material. The longitudinal edges of the vanes are left free of the black-out laminate to provide the required hinge points and flexibility along the edges of the vanes. When the black-out laminate is provided only on the central portion of the vanes, it is desirable to space the vanes closer together than described above in order to ensure that the blackout laminated central portions overlap when the window covering is closed, for maximum room darkening effect. For example, for a 2 inch wide vane with a 1½ inch wide black-out laminated central portion, the overlap of the vanes is preferable about ¼ inch.

Another possible vane material is vinyl or a laminate of a nonwoven material and a vinyl material. Generally, vinyl materials and laminates of nonwoven material and a vinyl material provide an increased room darkening effect but are soft enough that score-compressed hinge points are not required. Of course, score-compressed hinge points could be provided if necessary.

As discussed with respect to the first and second sheers of the window covering, when two woven fabrics are viewed in an overlaying relationship, an interference pattern or moire effect can result. When a nonwoven fabric is used for the vane material, the problem of a moire effect in the window covering when it is closed is avoided. In some instances, however, it may be desirable to use a woven or knit material for the vane material. A basic woven material will give a moire effect because this type of material has a very ordered orthogonal surface structure. To avoid a moire effect (overlay) when the window covering, having a woven or knit vane material, is in the closed position, a crepe woven material can be used as the vane material because crepe woven materials have a much more randomly oriented surface structure. Alternatively, the surface of the woven or knit material can be altered to randomize the surface fibers, for example, by sanding, napping or calendarizing.

Window coverings having first and second sheers and vanes of various colors, and combinations of colors are contemplated within the scope of the present invention. For example, to provide a more transparent window covering in the open position, dark sheer material can be used for the first and second sheers because dark colors reflect less light than lighter colors. Similarly, white or light colored sheer materials provide a more translucent effect when the window covering is open.

The vanes may be the same color or a different color than the first and second sheer fabrics. A problem of glue line showthrough has been experienced, however, when the vane material is a dark color and the first and second sheer fabrics are of a considerably lighter color or white. To overcome the problem of a dark glue line showing through a light colored sheer material when the vane is adhesively bonded to the first or second sheer fabric of the inventive window covering, a small amount of whitener, about 0.5 to 1.0% by weight, is added to the adhesive before it is applied to the vane material. A particularly suitable whitener is titanium dioxide. The addition of this whitening pigment to the adhesive eliminates the problem of dark colored glue lines being visible in a window covering wherein a dark colored vane is adhesively bonded to a lighter colored sheer fabric. Also, the addition of titanium dioxide to the glue can be a way to dull the glue lines.

With respect to the vanes, it has been unexpectedly found that by increasing the machine-direction or lengthwise tension on the woven material prior to and during application of a bonding composition, the machine-direction stiffness of the treated fabric is advantageously and significantly increased with only a slight increase in cross-direction stiffness of the treated fabric. The strips used for the vanes are cut from the treated fabric. A high ratio of machine-direction stiffness to cross-direction stiffness is desirable in the treated fabric, particularly when the treated fabric is to be fabricated into vanes. Depending upon the type and number of yarns in the woven textile material, the ratio of machine-direction stiffness to cross-direction stiffness for treated fabric according to this invention can range from between about 3:1 to 50:1, or more.

Increasing the machine-direction tension on the woven material while allowing neck down or letting the fabric go slack in the cross-direction causes the warp yarn filaments to draw in tightly and then the applied binder composition bonds these warp yarn filaments together such that the bonded filaments act as one much stiffer yarn. The lack of tension in the cross-direction allows the fill direction filaments to remain fluffy and, therefore, to not bond as easily to one another when the binder composition is applied.

In this process of treating the woven textile material to produce the treated fabric for the vanes, the fabric is treated with a low percentage (up to about 5%) by weight solids add on of a binder composition. The preferred binder composition is applied to the woven textile material in an amount of about 2% by weight solids add on.

The binder composition with which the woven textile material is treated can be any composition capable of filling the interstices in the woven textile material to bind the individual fibers. Examples of suitable types of binder compositions include elastomers which are capable of binding the individual fibers of the woven textile material and which are resistant to ultraviolet (UV) radiation and to breakdown or degradation due to other environmental factors. Especially preferred compositions are elastomeric acrylics and elastomeric urethane-type compositions. One particularly preferred composition is a latex emulsion which is a mixture of about 15 to 25% by weight of an acrylic and about 75 to 85% by weight of an elastomer. In addition, the preferred composition may include minor amounts of conventional latex emulsion additives such as a defoamer, a synthetic thickener, and the like. An especially suitable composition is a latex emulsion containing 71% by weight of the elastomer sold under the tradename V-29 by B. F. Goodrich; 27% of the acrylic binder sold under the tradename HA-16 by Rohm & Haas; 1.5% by weight of the defamer sold under the tradename Nalco 2305; and 0.5% by weight of the synthetic thickener sold under the tradename UCAR SCT-270 by Union Carbide.

Referring now to FIG. 1, a novel bonding technique is illustrated. Coming into the apparatus from the lower right, is a known compiled fabric input, designated generally by the reference number 30. The compilation 30 comprises a pair of overlying continuous webs of sheer 42, 44 between which are arrayed a plurality of narrow strips 32 extending transversely of the sheers 42, 44 and the strips 32 are in overlapping relation. Each strip 32 contains an adhesive line 34, 36 along its upper leading edge 38 (in machine direction) and its lower trailing edge 40 so that its upper leading edge 38 will bond (or is tack bonded) to the upper sheer 42 and its lower trailing edge 40 will bond to the lower sheer 44. The preferred adhesive is a hot-melt adhesive as previously described.

The compilation 30 is fed around a heated roller 50, an arcuate arrangement of perforated cooling rollers 52, a cooled roller 54, past an infrared heater 56, through the nip formed by a nip roller 58 and roller 54 and taken out as a bonded finished product at the upper right as indicated by reference number 60. A pair of closed loop teflon belts 62, 64 receive the compilation 30 to stabilize it during transit. Inner belt 62 extends around hot roller 50, over perforated cooling rollers 52, around cool roller 54, past IR heater 56 and nip roller 58, and around idlers 66, 68. Outer belt 64 extends around rollers 70, 72, 74, hot roller 50, perforated cooling rollers 52, cool roller 54 and nip roller 76. Selected rollers are driven as known in the art.

Hot roller 50 is at an appropriate temperature to activate the hot melt adhesive lines 34 and 36, to melt them sufficiently as compilation 30 transverses the hot roller 50. The teflon belts 62, 64 between which compilation 30 is sandwiched control the melted adhesive until it is resolidified by cooled perforated rollers 52 (air cooled) and liquid (water) or air cooled roller 54.

The two belts 62, 64 with the compilation 30 held between them are moved past the nip formed by roller 76 at which point belt 64 releases. The exposed compilation 30 is then passed over an arcuate section of roller 54 between the nips formed by rollers 76 and 58 and opposite IR heater 56 for the purpose of heating the outer exposed glue lines to soften them. As these softened glues lines pass around nip roller 58 the glue lines are dulled. Nip roller 58 is a steel roller with a 1/16 inch to ⅛ inch covering of a dulled or rough silicone rubber and serves to nip the exposed surface of compilation 30 and put a texture into it and make it not shine. Teflon belts 62, 64 cause the glue lines showing through the sheers to shine and this is considered by some people as detracting from the aesthetic appearance of the window covering.

Figure 2:
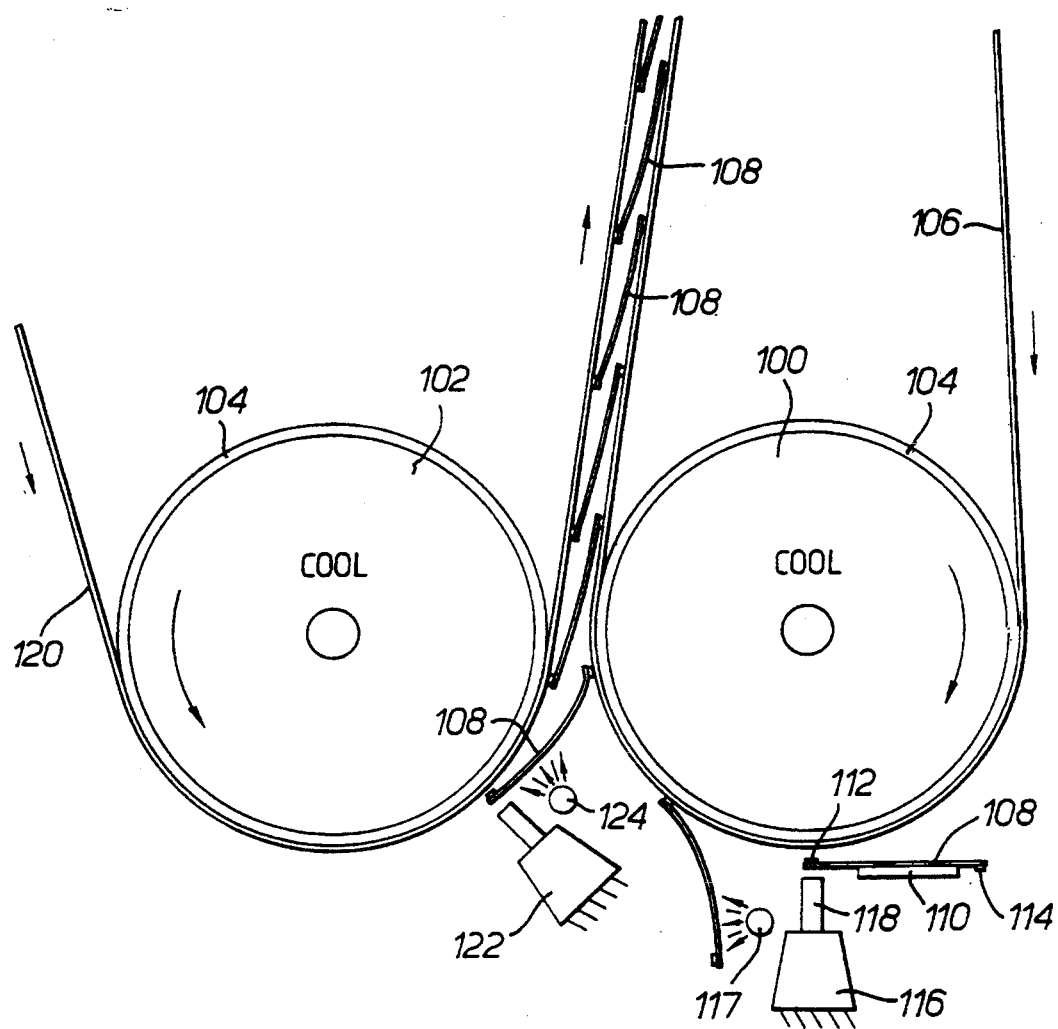
FIG. 2 is a side elevation view in schematic form showing another improved apparatus for effecting a compilation of fabric according to the present invention.

Teflon belts 62, 64 need to be continuous and need to be full fabric width. Also, if the belts are very wide, more than 70 inches, some wrinkling or buckling may be experienced. Therefore, the following processes and apparatus have been developed to avoid the necessity of using teflon belts. In FIG. 2 is shown a novel compilation technique. Two steel drums 100 and 102 are provided. Each is cooled (air or liquid) and each is covered with a ⅛ inch silicone rubber 104 having a dulled or rough surface serving as insulation and a release surface. A knitted sheer 106 is fed around drum 100. The sheer 106 at the bottom of drum 100, overlies a strip or vane 108 which has been fed by accelerator conveyor 110 to a position longitudinally in registry with sheer 106, that is transversely extending across the machine direction of travel of sheer 106. Vanes 108 are intermittently fed into position by a vacuum separator assembly as described in the referenced earlier application. Vane 108 has a glue line 112 on its leading edge, upper face and a glue line 114 on its trailing edge, lower face. A hot kicker 116 with a heated bar 118 is actuated to compress vane 108 and glue line 112 against sheer 106 and back up roller 100 faced or covered with the insulation and release surface provided by the ⅛ inch covering of silicone rubber. Heated bar 118 is at a temperature that activates glue line 112 to cause it to melt and join or bond sheer 106 and vane 108. The contact is for about 1 to 1.5 seconds duration and during this time drum 100 is stationary. Glue line 112 is composed of a hot melt glue or adhesive but may be a 2 part or 1 part glue (epoxy, urethane etc.) provided it is curable by heat (not radiant energy) in about one second.

Immediately thereafter drum 100 is advanced a step and receives the next vane 108, or drum 100 can advance a full step and back up a small distance. The advance can be less than the width of a vane 108 or can go forth and a smaller distance back so that the vanes 108 overlap in the final compilation. Alternatively, the advance can be more than full vane width and then backed or returned for the next vane. An air nozzle or jet, schematically referenced as 117, blows the bonded vane 108 away from drum 100 to enable the next vane 108 arriving on accelerator 110 to be bonded to sheer 106. Drum 100 can be advanced greater than a machine step and then retarded or moved backwards to the correct position for the next vane 108 as described in the referenced earlier application. Also, the movement of drum 100 can be continuous and kicker 116 can track the drum which tack or permanently bonding the vane 108.

A second knitted sheer 120 enters around drum 102 and merges with sheer 106 carrying vanes 108 at the nip between the drums. A second hot kicker 122, like the first, kicks to bond the trailing edge of each vane 108 to sheer 120 by melting glue line 114. The drums 100 and 102 are intermittently driven as previously noted and may be stepped together or independently and may step or advance while the next vane 108 is being brought into position of the accelerator 110. An air jet 124 can be employed to assist in the positioning of the trailing edge of vane 108 relative to drum 104 and sheer 120. The silicone rubber release surface and insulation 104 combined with the cold or cooled drums 100 and 102 enable heating and cooling in about 2 seconds so that the glue lines 112 and 114 do not come off into rolls or drums 100, 102 but stay in place and effect good bonds between vanes 108 and sheers 106, 120 with dulled glue lines having good aesthetic appearance. In a variation, the trailing edge of vane 108 can be tack or permanently bonded first and the leading edge bonded second.

Figure 3:
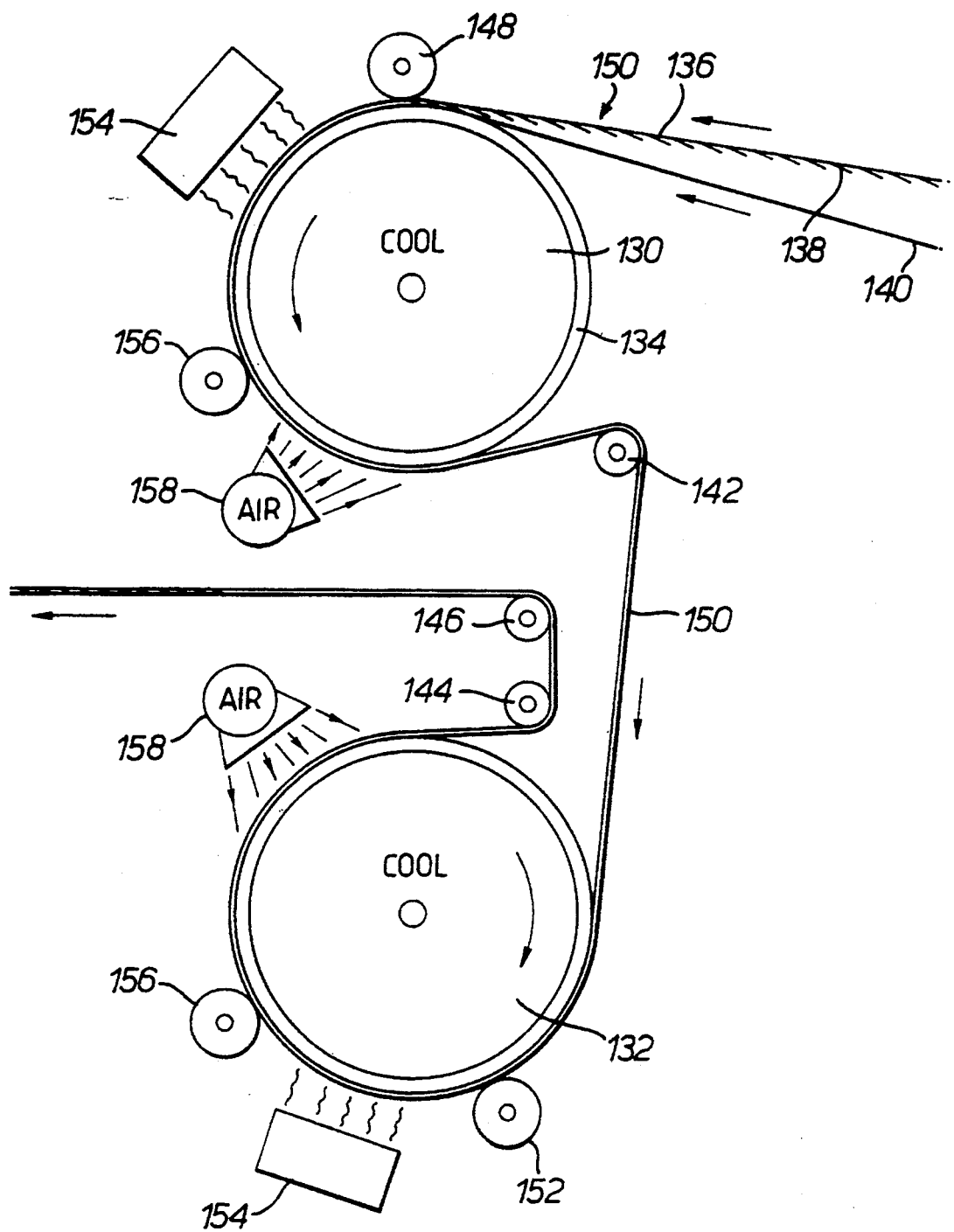
FIG. 3 is a side elevation view in schematic form showing a two-wheel IR bonding apparatus according to the present invention.

FIG. 3 shows a two roll system utilizing IR bonding. A pair of rolls or drums 130, 132 are provided, each cooled (air or liquid) and each having a 1/16 inch to ⅛ inch silicone rubber covering 134 providing insulation and a release surface. A compilation or collation 150 of the window covering is made consisting of a rear knitted sheer 136 to which are bonded the leading edges of vanes 138 (like vanes 108) and a front knitted sheer 140 which is fed separately to the input nip and contacted with vanes 138 and the glue lines on the trailing edges. The compilation is created at the input nip to roll 130 which is established by roll 148. This compilation or sandwich is fed around roll (drum) 130 to an idler 142 (approximately 270°) and then passed to roll 132 where it travels about 270° around roll 132 to idler 144, up to idler 146 and then drawn off horizontally to the left as shown in the Figure as a finished product. The input nip established by roll 148 coacting with roll 130 is provided to create and stabilize the compilation 150 as it starts around roll 130; likewise an input nip roll 152 is provided to stabilize the compilation 150 as it starts around roll 132.

Infra-red heaters 154 (conventional in design) are located 30°–45° after nip rolls 148, 152, in the direction of travel of compilation 150. After a further 30°–45° are located dulled or rough silicone rubber covered (about 1/16 inch to ⅛ inch thick) nip rolls 156. A further 30°–45° are located air cooling jets 158 directed normally against the partially or fully bonded compilation 150 before it leaves the cooled back up roll 130, 132. The compilation is longitudinally stabilized between nip rolls 148 and 156 on both back up rolls 130, 132. Rolls 156 are cooled and rolls 148, 152 may be cooled.

In the system of FIG. 3, the glue lines on the leading and trailing edges of vanes 138 are heated, melted, and then cooled against a dull, rough textured hard surface. The surface below the glue, in other words, the back-up roll 130, 132 first heats up due to the heat conduction (heat transfer) from the heated compilation as it passes under the IR heater and then cools down because cooled back-up roll is covered with 1/16" to ⅛" of release material (a silicone rubber surface which has a dull texture). Rolls 156 are also covered with the same release material. This release material has an insulating characteristic to it such that as the infra-red heats the top side of the fabric, the outermost side of this release insulating material (silicone rubber) reaches almost the same temperature as the fabric, allowing the glue to melt against it. However, when the roll turns such that it is not directly under the infra-red heater, it cools quite quickly by conduction because there is only 1/16" or ⅛" of insulating material in its path. Air cooling further accelerates this cooling effect. What happens, therefore, is that the glue closest to the back-up roll is first cooled as it comes near the back-up roll, then is heated by the infra-red to melting point, then is cooled again before it leaves contact with this back-up roll. Even though the roll covering is made of a release material, glue would still stick to it to some extent if the glue is not cooled and completely solidified before compilation 150 leaves the back-up roll. Also, rolls 156 further cool and impress the semi solid glue to give a textured finish.

Perhaps equally important, the glue that cools in contact with the back-up roll actually has better strength than glue which cools on the outside i.e., the glue closest to the infra-red heater. The reason for this appears to be that the glue impregnates and penetrates through the fabric and then smears out on the other side of the sheer fabric through contact with the back-up roll and its release surface and the pressure imposed on the compilation as it traverses around the back-up roll. Thus, the glue bridges over the fibers and threads of the sheer fabric and totally encapsulates them. Roll '156 creates the same encapsulation bond for the opposite side of the bonded compilation. For this reason, two infra-red heaters and two back-up rolls may be used, but are not essential, one hitting one side of the fabric and then the other one hitting the other side of the fabric. After the first one, the whole system is bonded together. The side toward the backup roll may be slightly stronger than the side that was toward the infra-red heater, but the effect of roll 156 generally produces an equal bonding. After the second one, the second side may be made stronger, and the side facing the infra-red heater remains strong because the glue is not pushed away from its encapsulation bonding of the sheer fabric, that is, the encapsulation effect fully remains. The final glue lines show through but come out inherently dull and textured because of the rough textured silicone nip roll 156 which follows the infra-red heater on each back-up roll 130, 132. If both sheers or fabrics 136, 140 are porous, the encapsulation bond is created on both sides. Only one sheet or fabric 136, 140 need to be porous.

Figure 4:
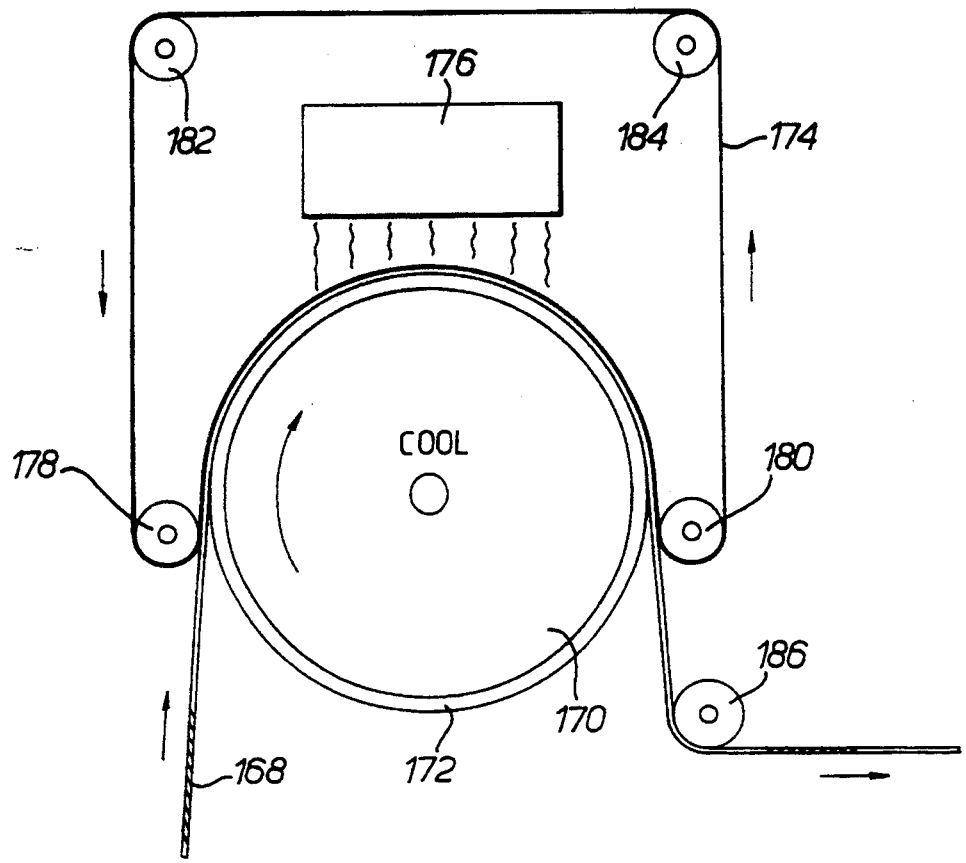
FIG. 4 is a side elevation view in schematic form showing a one-wheel bonding according to the present invention.

FIG. 4 shows a variation of FIG. 3 using a single roll 170 provided with a 1/16" to ⅛" dulled silicone rubber release covering 172. In this system, a known compilation or collation 168 passes around roll 170 for slightly more than 180°, exiting via idler 186. An IR heater 176 is located above the roll 170 and heats the compilation 168 to melt the hot melt adhesive used for the glue lines on the vanes to bond the compilation together. A closed loop teflon belt 174 traversing a path determined by idlers 178, 180, 182 and 184 (one of which is driven) and roll 170 presses and stabilizes compilation 168 against roll 170. The roll 170 is cooled (air or liquid) so the effects ascribed in FIG. 3 occur, at least for the glue joints against the release surface of roll 170. A separate operation using an IR heater and dulled silicone rubber covered roll could be used to dull the glue joints nearest the IR heater or oven 176, if desired.

Figure 5:
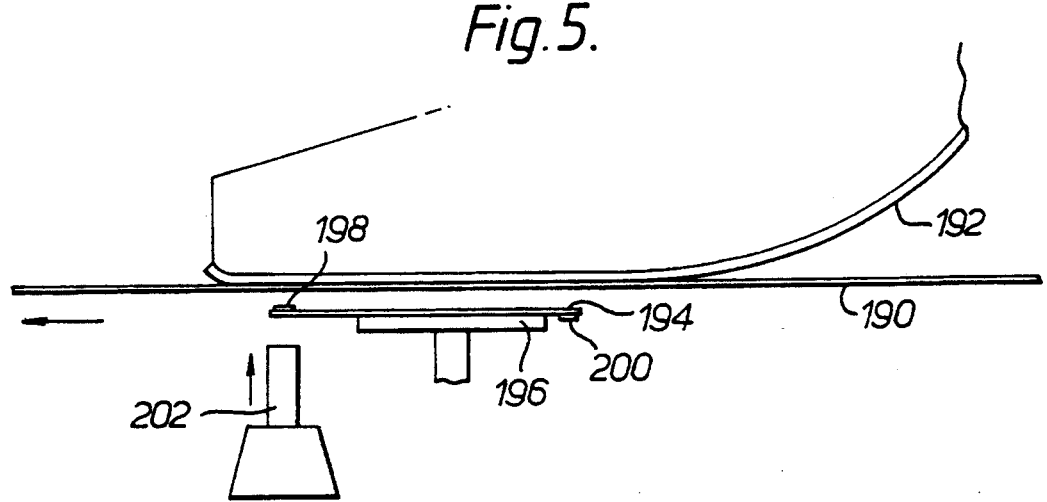
FIG. 5 is a side elevation view in schematic form showing an improved technique for tack or permanently bonding vane material during compilation according to the present invention.

FIG. 5 shows a variation of the tack bonding techniques used in the referenced earlier copending application Ser. No. 07/701,165 filed May 17, 1991. A knitted sheer web 190 feeds from the right of the drawing down along a straight or curved back up plate or anvil 192 and to the left. The anvil 192 is maintained at ambient temperature. Anvil 192 is comprised of a back up plate, such as aluminum, with a non-stick coating, such as teflon. The feed for web 190 is intermittent and actually is a step forward and then a fraction of a step rearward, and then stopped for a vane attachment. As explained in the referenced earlier copending application, this is necessary to effect vane overlap. The vane 194 feeds in transversely (into the sheet of drawing) via an accelerator conveyor 196 constituting part of a vacuum separator assembly (known from the earlier referenced copending application). The vane 194 has on its leading edge, upper face a glue line 198 and on its trailing edge, lower face a glue line 200. A hot kicker bar 202 (known from the earlier referenced copending application) sits directly below the leading edge of vane 194. Kicker bar 202 is maintained at a temperature of from about 380° F. to about 430° F. with about 400° F. being preferred. When the web 190 stops, hot kicker bar 202 presses the leading edge of vane 194 against the web 190 which is backed by an aluminum plate covered or not with Teflon and melts the glue or adhesive (usually a hot-melt adhesive) to create a bond between vane 194 and web 190. If the contact between hot kicker bar 202 and vane 194 is only about 1/10 of a second, a tack bond is created. If the contact is for about 1.5 seconds, a permanent bond can be effected, as described with reference to FIG. 2. Alternatively, the web 190 can move continuously and kicker 202 can be mounted for tacking the web 190 to kick the vane 194 to tack or permanently bond it to the web.

Figure 6:
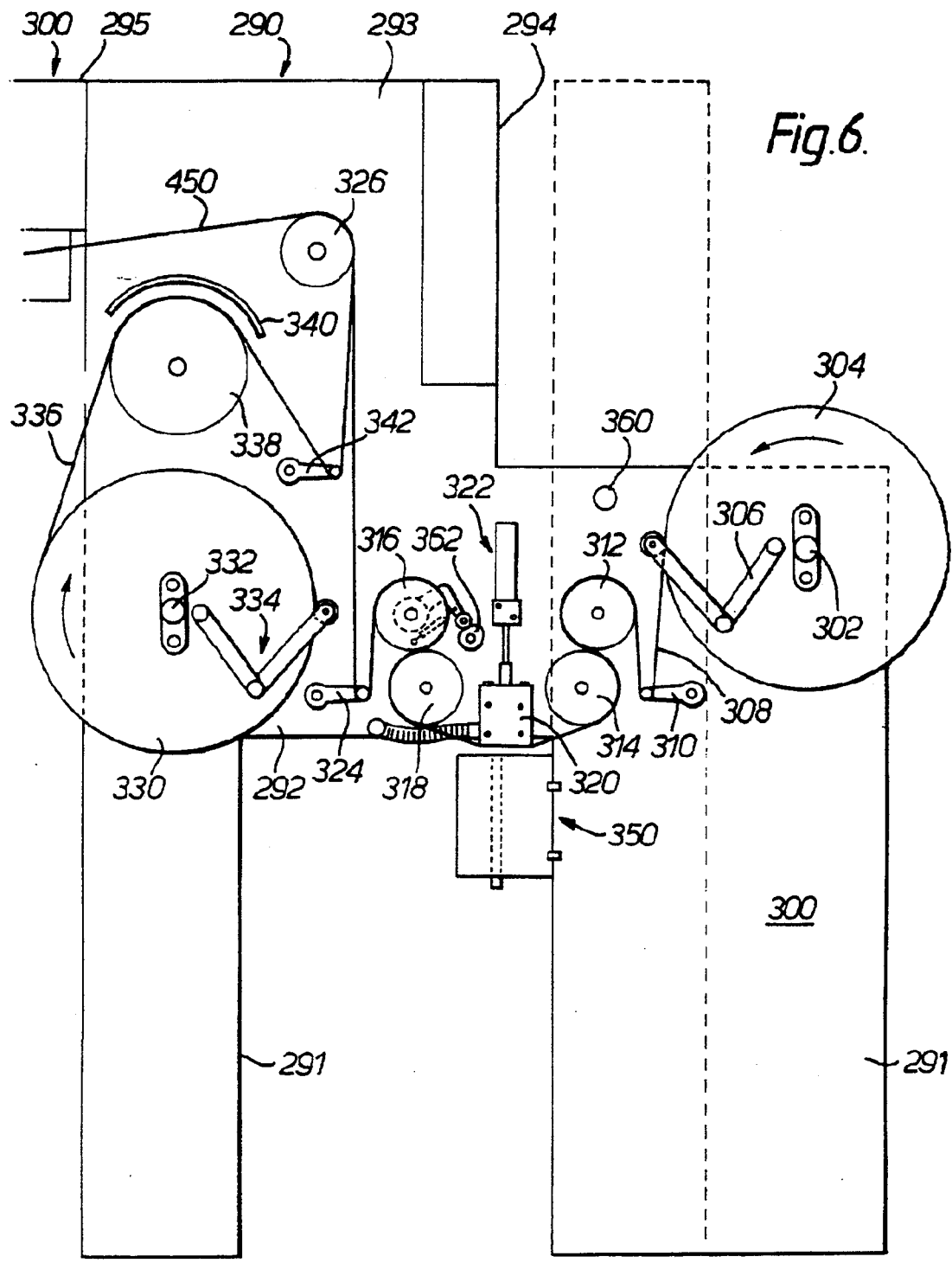
FIG. 6 is a side elevation view in schematic form of a preferred apparatus for carrying out preferred compilation steps of a preferred method for making a fabric light control window covering according to the present invention.
Figure 14:
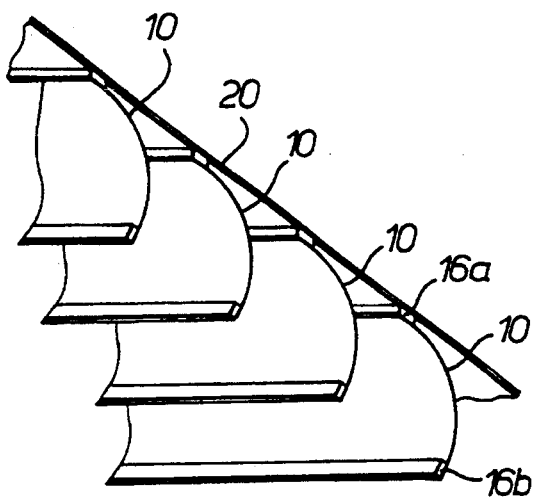
FIG. 14 is a schematic view showing vanes tack bonded to a sheer.

FIGS. 6 to 12 show a new method and apparatus for making a window covering product of the type described herein, especially with reference to FIGS. 13–15. Referring initially to FIG. 6, the formation of the compilation or collation of the window covering will be described initially. A machine frame, generally designated as 300 (onto which are mounted directly or indirectly all components and parts hereinafter described) has a shaft 302 mounted on it arranged to receive a supply roll 304 of a knitted sheer. A simple known roll size indicator 306 is provided to show the state of unwinding of roll 304. The actual web 308 of knitted sheer is drawn off roll 304 and passes around a passive gravity acting dancer 310 before entering a set of four rolls 312, 314, 316 and 318 mounted in vertically arranged (although slightly offset) pairs in frame 300 on opposite sides of a hot shoe assembly 320 variably positioned vertically by a known pneumatic piston and cylinder assembly 322.

Frame 300 consists of two side plates 290, each having two legs 291, an upper single extension 293 and a central connecting web 292. The two extensions 293 are connected by a stabilizer cross 294 and by a box cross connector 295 to two side plates 296 that form the sub-frame for the bonding zone. A second stabilizer cross 297 connects side plates 296 at their bottoms.

Figure 7:
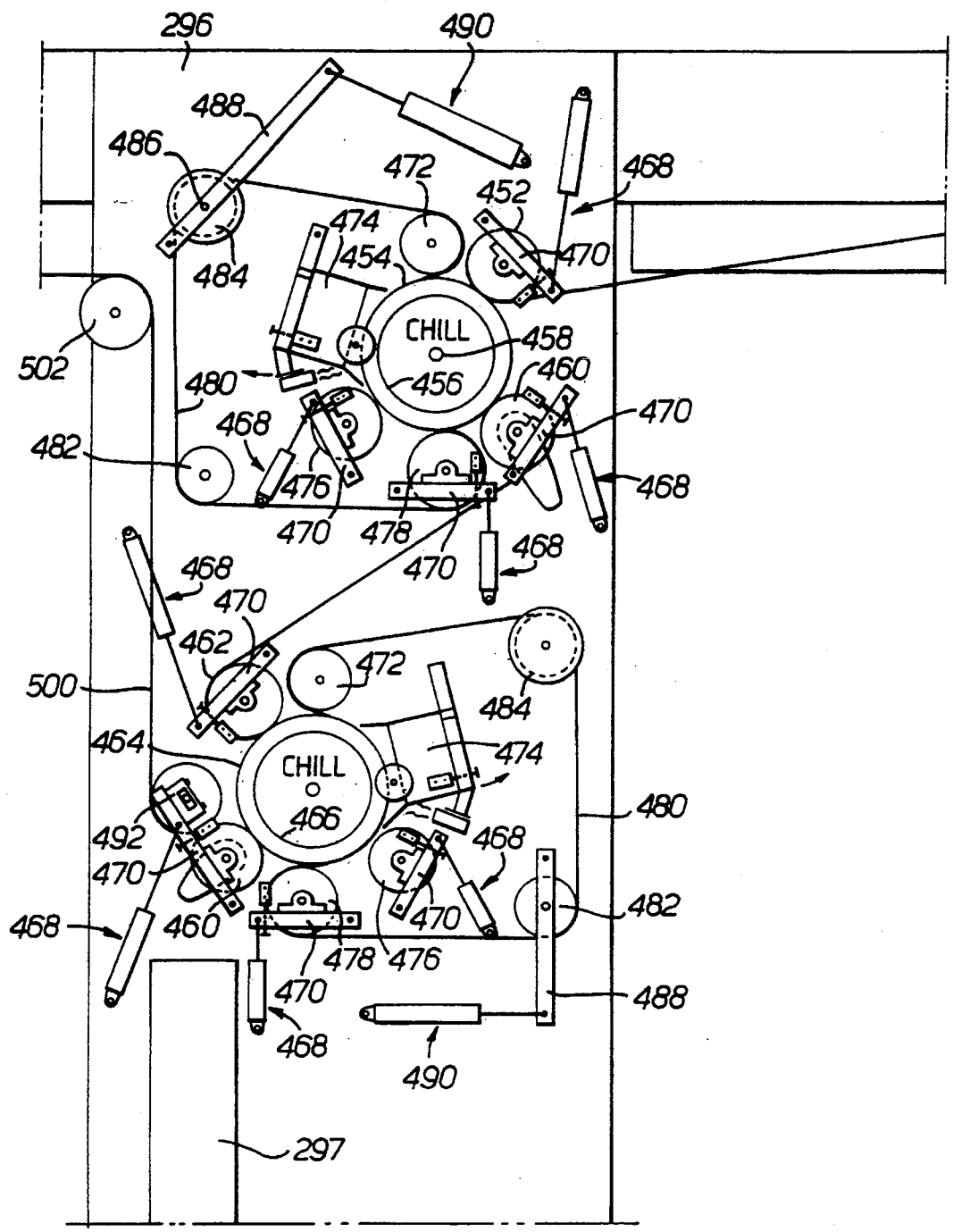
FIG. 7 is a side elevation view in schematic form showing a preferred bonding of the compilation resulting from FIG. 6 according to the present invention.

The web 308 passes over the top of roll 312, down and under roll 314, under hot shoe 320, under roll 318 and up over the top of roll 316 and then down to a second passive gravity acting dancer 324 before rising vertically to pass around an idler 326 and exit the compilation zone horizontally toward bonding. The rolls 312, 314, 316 and 318 are all drive rolls and are steel rolls faced or covered with a rough material that has good gripping characteristics, such as, rubberized cork. Meanwhile, a second knitted sheer 336 or tulle exhibiting a diamond pattern is drawn off supply roll 330 carried by a shaft 332 and fitted with a roll size indicator 334. Sheer 336 passes upwardly and around a hot aluminum teflon shrink wrapped roll 338 provided with a spaced heat shield 340 and then down to a third passive gravity acting dancer 342 before passing upwardly again to join the web 308 as it begins to wrap around idler 326. Alternatively, sheer 336 can join web 308 at nip roll 452 (FIG. 7).

As web 308 passes under hot shoe 320, an accelerator and hot kicker subassembly, generally designated as 350 operating normal to the machine direction of web 308 brings a series of vanes with adhesive or glue lines on their edges, in the manner as previously described, and attaches them serially in overlapping fashion to web 308 as it stutter steps (advances, pulls rearward and stops) underneath hot shoe 320. The hot kicker and accelerator conveyor are generally as described in the earlier referenced copending application as noted hereinbefore and the accelerator conveyor will be further described in the following. The kicker 350 is operated at ambient and hot shoe 320 is heated to 150° F. to 200° F. Alternatively, hot kicker 350 can be heated to about 400° F. (380° F.–430° F.) and shoe 320 kept at 100° F. to 150° F.

Figure 10:
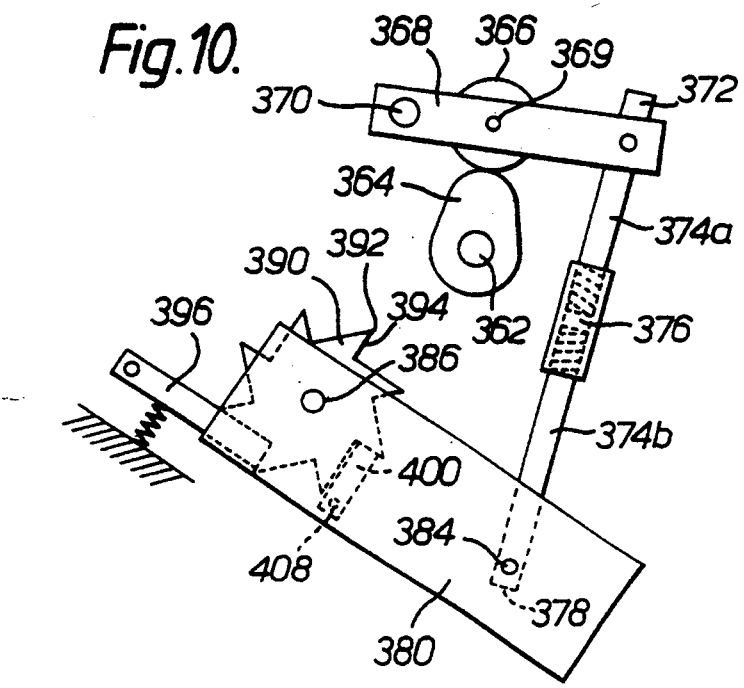
FIGS. 10–12 are a side elevation view, a top plan view, and a side elevation view, respectively, in schematic form showing the details of the novel advancing and retarding mechanism used during compilation according to the present invention.
Figure 11:
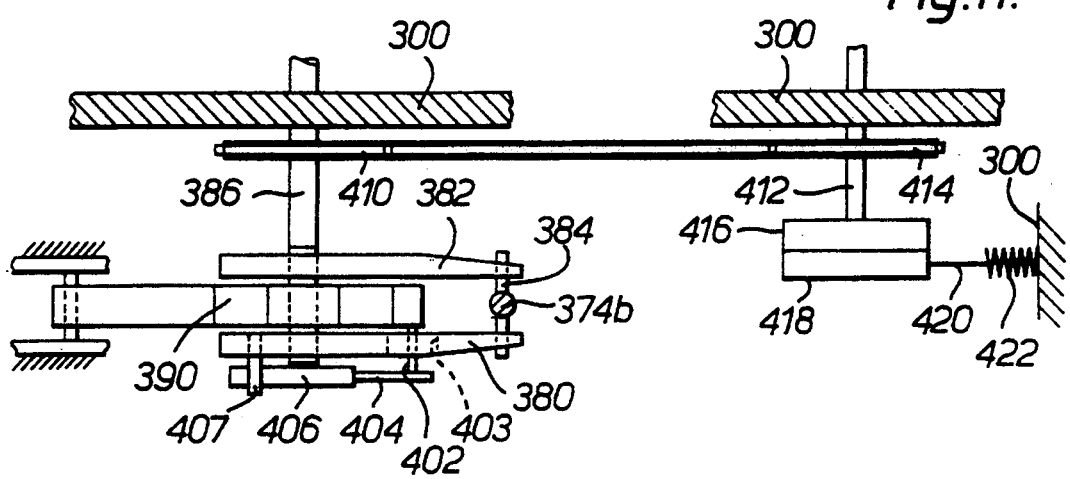
Figure 12:
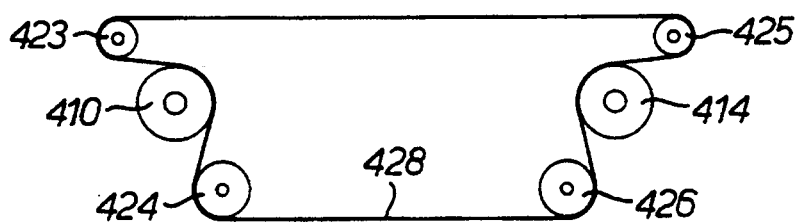

The drive for the rolls to produce the intermittent forward, rearward, stop movement of web 308 will now be described. The main drive shaft 360 driven by a motor (not shown) drives a cam shaft 362, located near roll 316, by a chain drive and sprocket wheels in a conventional way. The drives and controls for the rolls 312, 314, 316 and 318 are mounted on the connecting web 292 of one side plate 290 and are shown best in FIGS. 10–12. Referring to FIG. 10, cam shaft 362 has a cam 364 fixed on its end and cooperates with a follower 366 mounted on a bracket 368 by a shaft 369. Bracket 368 is pivotally mounted at one end by stub or pin 370 to the frame 300. At the other end of bracket 368 is pivotally fixed one end 372 of a two piece rod 374a, b, threaded for length adjustment. The other end 378 of rod 374a, b is pivotally fixed to a pair of bracket plates 380, 382 via shaft 384. A second shaft 386 also pivotally interconnects bracket plates 380, 382 and pivotally mounts the bracket plates in frame 300. A ratchet wheel 390 with teeth 392 defining right angle shoulders 394 is fixed on shaft 386. A spring biased stop pawl 396 pivotally mounted relative to frame 300 normally engages a shoulder 394 of a tooth 392 of ratchet wheel 390 to prevent movement CW (clockwise) as viewed in FIG. 10.

A lift or advance pawl 400, is positioned between bracket plates 380, 382 to engage a shoulder 394 of a tooth 392 of ratchet wheel 390. Lift pawl 400 is pivotally mounted to bracket plates 380, 382 by shaft 408. One end of a rod 402 is fixed to lift pawl 400 above shaft 408 and extends through an opening 403 in bracket plate 380 and is attached to the end of a piston rod 404 extending from and constituting a part of a pneumatically actuated piston and cylinder assembly 406 mounted on bracket plate 380 by stub 407. The orientation of assembly 406 is such that actuation of the cylinder reciprocates rod 404 outwardly pivoting pawl 400 into and out of engagement with a shoulder 394 of a tooth 392 to advance or not advance ratchet wheel 390 in a CCW direction (counter clockwise) as viewed in FIG. 10 however, an air pressure may be used for this purpose.

Piston and cylinder assembly 406 is normally spring biased to keep lift pawl 400 out of engagement with rachet wheel 390. A sprocket 410 is fixed to shaft 386 as is roll 316 and both will rotate when ratchet wheel 390 advances (CCW). Spaced from sprocket 410 is a shaft 412 rotatably mounted in frame 300 which has fixed on it roll 312, a sprocket 414 and a friction clutch 416 with one plate fixed on shaft 412 and its other plate fixed to a pulley 418 rotatably mounted on shaft 412. A cable 420 has one end fixed to pulley 418, winds a few turns around pulley 418 and has its other end attached to one end of tension spring 422 whose other end is fixed to frame 300. Sprockets 424 and 426 are fixed to extensions of the shafts for rolls 314 and 318 and all sprockets 410, 414, 424 and 426 lie in a common plane as well as idlers 423 and 425. An endless chain drive 428 mechanically, drivingly couples the four sprockets and two idlers, see FIG. 12, so all of the rolls 312, 314, 316 and 318 are driven cooperatively to move the web 308 in the appropriate direction.

When operating, the drive shaft 360 drives cam shaft 362 and cam 364 to oscillate bracket 368 thereby oscillating bracket plates 380, 382. If advance pawl 400 engages ratchet wheel 390, wheel 390 is intermittently turned counter clockwise as shown in FIG. 10, rotating rolls 312, 314, 316 and 318 to advance web 308 in the forward machine direction. The advance produced (2" to 2.75") is greater than the tooth spacing of wheel 390 (overdriving), therefore, stop pawl 396 is moved beyond the next shoulder 394 to an intermediate position between adjacent teeth 392. Meanwhile, the advance has caused pulley 418 to wind up cable 420 and load spring 422. When cam 364 causes the maximum lift of advance pawl 400 (counterclockwise oscillation), it then begins to cause a reverse oscillation of the bracket plates 380, 382, that is the plates begin to oscillate downwardly and clockwise as viewed in FIG. 10. This downward oscillation draws lift pawl 400 downward. As lift pawl 400 tends to move away from the tooth 392 with which it is engaged, loaded spring 422 reverse drives the rachet wheel 390 in the clockwise direction, backing up rolls 312, 314, 316 and 318 (from ¼" to 1") until stop pawl 396 strikes the first to encounter shoulder 394 The preferred advance is 2¾ inches and the preferred backup is one (1) inch. The web 308 stops and the hot kicker tack or permanent bonds the vane in position across the web. Meanwhile, the downward oscillation of plates 380, 382 and lift pawl 400 continues until lift pawl 400 slips over the next tooth 392 and is position to advance the wheel 390 during the next cycle. During all this activity the dancers 310, 324 and 342 enable the sheers 308 and 336 to be fed continuously from their respective supply rolls and to be fed continuously to idler 326 and to the bonding operations described hereinafter.

Referring particularly to FIG. 7, the bonding of the compilation or collation 450 leaving idler 326 will now be described. Compilation 450 travels under box cross connector 295 of frame 300 to roll 452 mounted in side plates 296. All parts of the bonding apparatus are mounted on side plates 296 directly or indirectly. Roll 452 forms a nip with large back up roll 454 which is chilled by water cooling and also driven via a conventional takeoff from the main drive of the machine, drive gear 456 coaxially being fixed to roll shaft 458 for this purpose. The compilation 450 passes around roll 454 for about 300° and exits via passing around roll 460, also forming a nip with roll 454, and then transits to roll 462 forming a nip with a second large back up roll 464 also driven by gear 466.

Rolls 452 and 460 are adjustably mounted on side plates 296 for movement to or away from roll 454 to adjust the tension or pressure of the nip with roll 454. This is accomplished by a piston and cylinder assembly 468 acting through a pivotally mounted arm 470 bearing against the shaft of roll 452 (or 460) which sits in a slot in side plates 296.

Spaced around back up roll 454 are located band idler 472, and IR heater or oven 474 operating at a power of 17 KW, roll 476, and a second band idler 478. Both roll 476 and idler 478 are provided with piston and cylinder assemblies 468 and pivotally mounted arms 470 for adjustment relative to back up roll 454. The IR heater 474 is mounted slightly spaced from back up roll 454 and is fitted with a pivot and stop so it can be lifted away from roll 454. The IR heater has a power of 17 KW. A tenter subassembly is provided consisting of a pair of one inch wide endless or looped flat bands 480 that run with a speed of 4.7 feet/minute on each edge of the compilation 450 as it runs around back up roll 454 to prevent lateral or transverse shrinkage. These bands 480, on each side, run around idler 472, back up roll 454, adjustable idler 478 to assist in controlling band tension around back up roll 454, idler 482 and spool 484 for alignment. Spools 484 are longitudinally adjustable mounted on a shaft 486 to obtain width adjustment and shaft 486 sitting in slots in frame 300, passes through a pivotally mounted band tension arm 488 that pivots responsive to actuation of a piston and cylinder assembly 490 to adjust band tension. A suitable width of the compilation is, for example, six feet. Prevention of longitudinal shrinkage of compilation 450 is accomplished by pressure adjustment of the nips between rolls 452, 460 and back up roll 454.

Rolls 452, 476, 460 and 454 are all water chilled to about 50° F. and are all covered with a ⅛ inch thick covering of a dull or rough silicone rubber to provide an insulating and release surface. As the compilation passes at a speed of about 4.7 feet/minute around back up roll 454, rolls 452 and 460 prevent longitudinal shrinkage, the bands 480 of the tenter frame subassembly prevent lateral shrinkage, IR heater 474, operating at 17 KW, causes the glue lines on the leading and trailing edges of the vanes to melt and impregnate into and through the interstices of the sheers 308 and 336 and to be spread out across the surfaces of the sheers remote from the glue lines to achieve an encapsulation bonding of the vanes to the sheers. The surface of back up roll 454 as it passes IR heater 474 is locally heated by conduction but cools after passing the IR heater 474. The glue or adhesive melted during exposure to the IR energy during passage beneath IR heater 474 cools and solidifies rapidly due to the fact that back up roll 454 is water chilled and roll 476 is water chilled. Also, because the sheers of compilation 450 are contacted with the dull, rough silicone rubber (insulation and release) surface of back up roll 454 and roll 476, the final solidified glue lines will be dull and textured and have a good aesthetic and pleasing appearance.

What is described above is a first bonding station. A second bonding station follows the first bonding station and is substantially a mirror image of the first station. The purpose of the second bonding station is that described in conjunction with FIG. 3. Except for parts already referenced or which will be referenced because of a difference, like parts have been designated by the same reference number. In the tenter subassembly for the second bonding station, idler 482 and not spool 484 is made adjustable for controlling band tension. Spools 484 are still slidably adjustable on their shaft for width adjustment and band alignment. In the second bonding station rolls 462 and 460 control longitudinal shrinkage in the manner discussed with reference to the first bonding station. However, tension arm 470 now has been elongated and provided with short plates 492 to support an idler 494 that is spring biased to form a nip with roll 460 to positively pull the bonded compilation, now a completed or finished window covering product designated by reference number 500 from back up roll 464. A pivoted arm, not shown, like arm 470 is similarly equipped on the opposite side of the machine to provide the support at the other end of idler 494, but from the above description this is now a simple mechanical expedient. As previously noted, rolls 462,476, 460 and 464 are covered with a ⅛ inch covering of rough silicone rubber.

Figure 8:
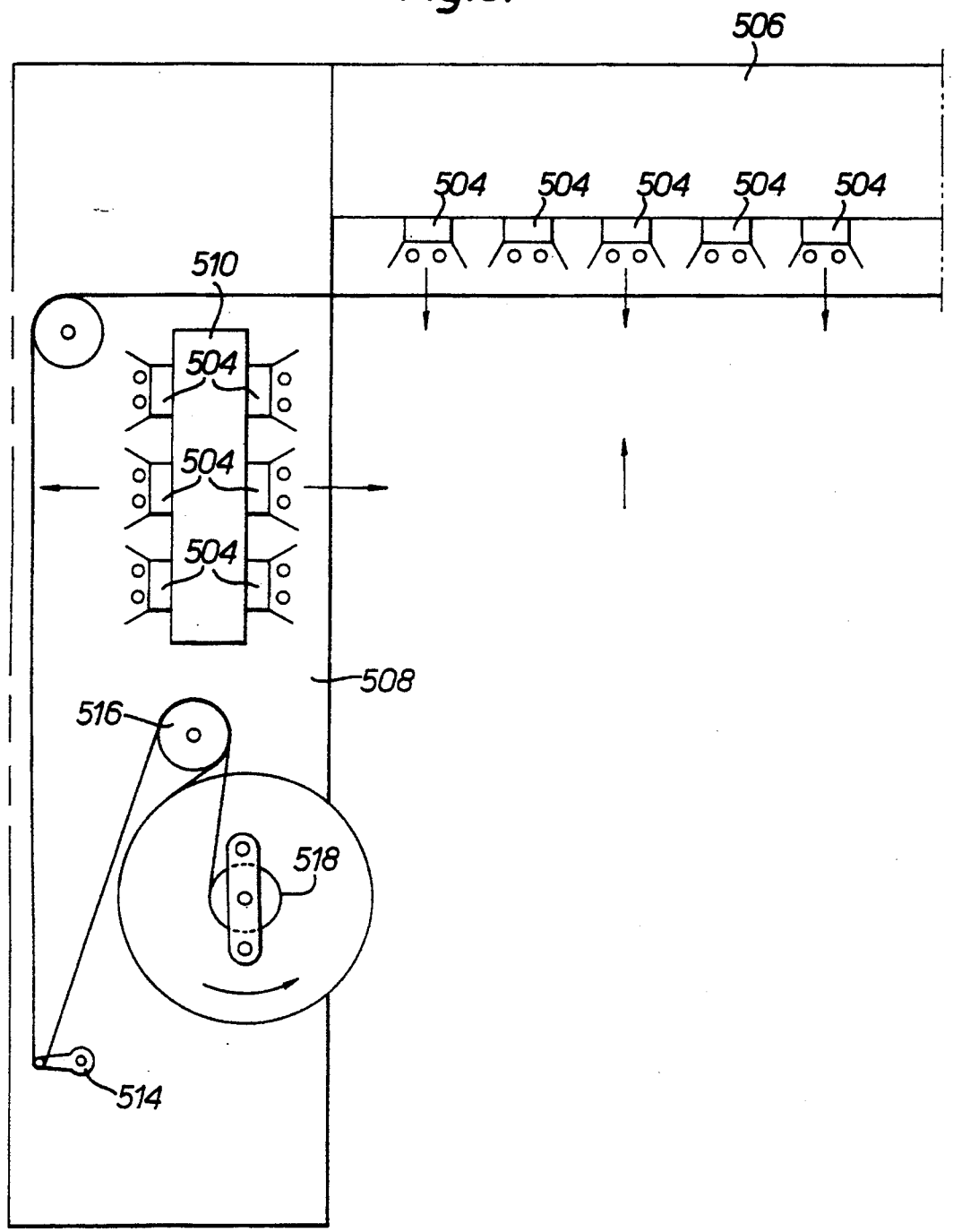
FIG. 8 is a side elevation view in schematic form showing inspection of the bonded, compiled window covering resulting from FIG. 7 according to the present invention.

Inspection of the finished product 500 is shown in FIG. 8. The finished product 500 travels vertically from idler 494 to an idler 502 (FIG. 7) whereupon it is turned to the horizontal and moves away from side plates 296 under a series of fluorescent lights 504 mounted to the bottom of a second box cross connector 506 of frame 300 which connects side plates 296 with two side plates 508 of frame 300. A third stabilizer cross 510 interconnects side plates 508. The finished product 500 travels horizontally to an idler 512 mounted in side plates 508 near the far edge and is turned vertically to travel down to dancer 514 then up around rubberized cork covered drive roll 516 to be wound up on take up spool, tube or roll 518. Fluorescent lights 504 are mounted on stabilizer cross 510 facing toward and away from side plates 296. Inspection of the finished product 500 is accomplished visually by a person standing under box cross connector 506 looking between idlers 494 and 502, up toward box cross connector 506, and between side plates 508. A further inspection is made visually by standing outside side plates 508 and looking between side plates 508 toward stabilizer cross 510.

Figure 9:
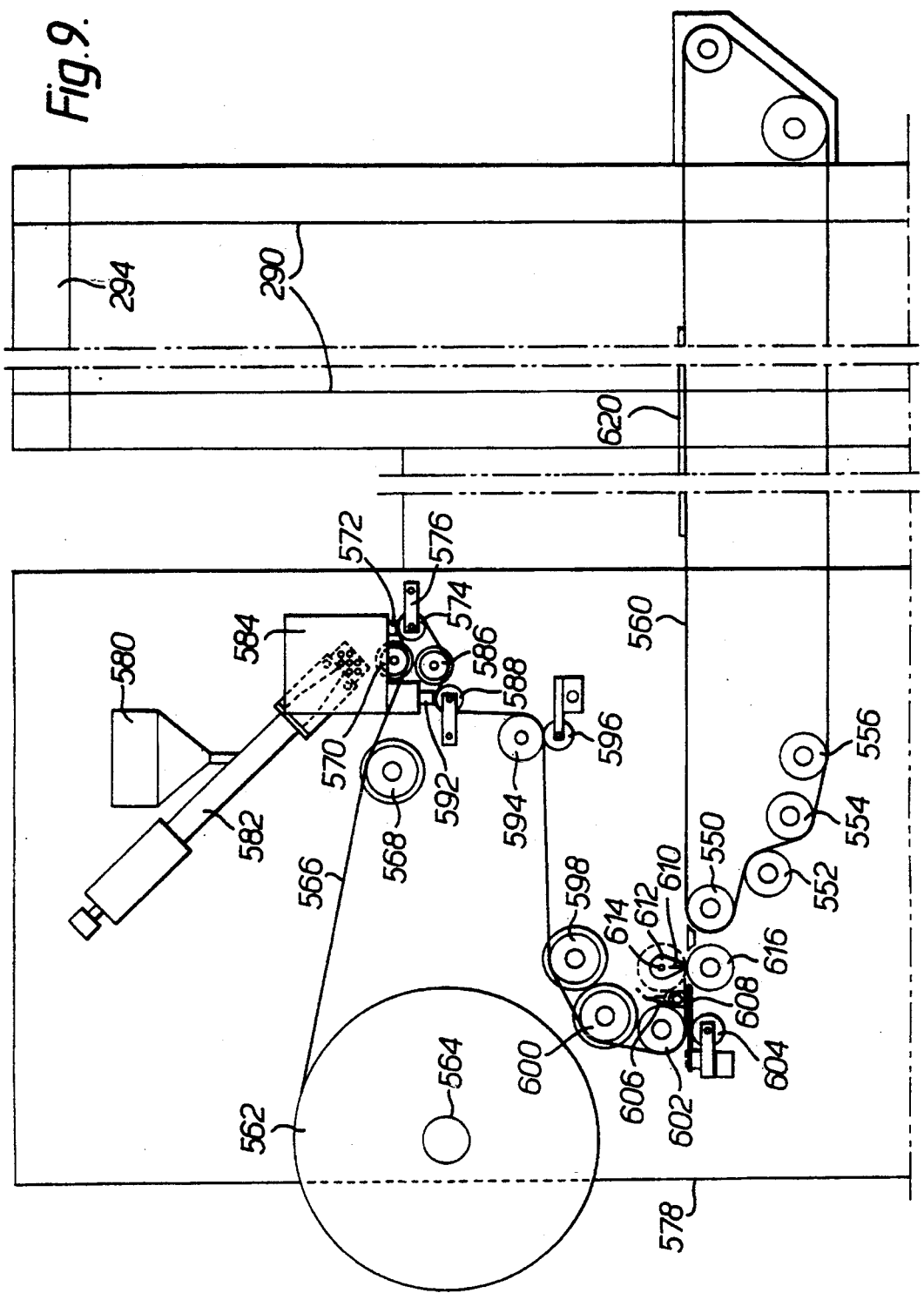
FIG. 9 is a side elevation view in schematic form showing the vane formation and preparation according to the invention.

Referring now to FIG. 9, the vane preparation and accelerator 350 will be described. The accelerator consists of an endless loop or flat perforated belt 560 running around rolls 550, 552, 554, 556, at one end and idler rolls at the other end, not shown and over a vacuum housing as described in the referenced earlier application. The sheer 308 is running normal to the drawing between side plates 290 under stabilizer cross 294, so that belt 560 brings vanes into position laterally across sheer 308. Rolls 550, 552 and 554 are drive rolls, roll 556 is an aligner. A strip spool 562 is mounted on shaft 564 and strip material 566 to be cut into vanes is drawn off the supply spool 562 and fed over an aligner spool 568, under an aligner spool 570 and over a back up roll 574 beneath a glue applicator 572 which lays down a glue line along one edge of strip 566 (such as glue line 16a FIG. 13). Back up roll 574 is adjustably mounted by yolk 576, and support is provided by box frame 578.

Applicator 572 receives its supply from a conventual glue supply 580 that feeds glue into a conventional glue heater and feeder control 582 which in turn feeds the glue through an inline filter 584 so that the glue is melted and fed and filtered immediately before it is applied via applicator 572 to the strip 566. The strip 566 is running at about 200-350 feet per minute and the glue, a hot melt adhesive type, air dries in about 0.5 seconds. Strip 566 next passes under aligner 586 and over roll 588 adjustably supported by yolk 590 under a second glue applicator 592. Strip 566 has been turned over during this travel and now applicator 592 applies a glue line along an opposed edge of strip 566 and on its opposite face (see glue line 16b FIG. 13). Strip 566 now passes around roll 594 and through the nip formed by rolls 594, 596, around aligners 598 and 600 to a drive roll 602 forming a driving nip with back up roll 604 which feeds the strip 566 along table 608 toward a knife 610. Air jet 606 blows an air jet down on the strip 566 as it passes under the knife and enters onto belt 560 of the acceleration conveyor. As described in referenced earlier co-pending application the perforated belt 560 runs on a guided track on a box housing with perforations serving as a vacuum manifold and a vacuum is drawn to hold the strip on belt 560 as it is moved into position to be bonded to sheer 308.

The knife 610 is mounted in the small end of a teardrop shaped roll 612 that rotates about an axis 614 located centrally of its large end, and thus, the smallest surface of roll 612 is presented to strip 566 during each severing step. As known, the knife 610 is arranged to be activated after a predetermined number of revolutions to obtain cut vanes of desired length. Hardened back up roll 616 cooperates with knife 610 and horizontally mounted doctor blade 618 is applied against back up roll 616 to prevent the strip 566 from wrapping accidentally around the back-up roll 616. Doctor blade 618 also serves as a lead-in to conveyor belt 560 as it passes around drive roll 550. When a vane 620 (see vane 194 FIG. 5 as an example) is cut off from strip 566 by knife 610, it is accelerated by the conveyor (operating at about twice the speed of strip 566) into position beneath sheer 308 between side plates 290 whereupon it will be tack bonded by the hot kicker as previously described.

The controls for the system will be readily apparent from the manipulations described that are desired to be accomplished. All piston and cylinder assemblies are pneumatically operated and controllable, preferably by electrical or electronic components actuated responsive to sensors which may be mechanically initiated such as by microswitches or optically initiated such as by photocells or other light sensitive devices. In particular, a photocell is positioned to detect whether or not a vane 620 is in position on the accelerator 350 ready to be hot kicked and tack or permanently bonded to sheer 308. If not detected, air cylinder 406, which in repose is spring biased to keep advance pawl 400 out of engagement with ratchet wheel 390, will not be actuated and bracket plates 380, 382, although oscillating as usual, will not cause ratchet wheel 390 to initiate advance of the sheer 308 which will simply remain stationary for that machine cycle (one rotation of cam 364). Therefore, an operator of the vane cutting operation can visually inspect strip 566 and the vanes 620 as they are being cut off from strip 566 and if he detects a defective vane 620 he can simply lift it off conveyor belt 560 and discard it. When no vane 620 is detected ready to be hot kicked, the sheer 308 will remain stationary for that or as many machine cycles as occur for which no vane 620 is present in position to be hot kicked. When the machine is operating normally, air cylinder 406 will be actuated holding lift pawl 400 in lifting position relative to ratchet wheel 390 with the air in cylinder 406 providing the resilient force to allow the lift pawl to ratchet during downward movement of the bracket plates 380, 382.

The edges of the vanes, leading and trailing can be impregnated with any suitable material to stiffen them prior to application of glue lines to give a more rigid structure when the vanes are bonded to the sheets or sheers. Also, the glue lines can be discontinuous, if desired. The vanes are disposed parallel between the two webs during compilation and may extend traverse or across the webs or in the machine direction of the webs.

The forward and back movement of the fabric can be eliminated and the fabric moved intermittently always forward. The just attached vane would have to be moved out of the way for the next to be attached vane. This could be done by an air jet appropriately directed and of sufficient force. Also the hot kicker could be shifted out of the way. Also, the trailing edges of the vanes can be attached first instead of the leading edges. It is possible to run the web continuously but care would be required to be sure of proper vane alignment.

Also, the vanes can be attached to the top face of web 308 instead of the bottom face. Preferably, the leading edges of the vanes would be more easily effected if the trailing edges were attached first.

Although the present invention has been described with reference to specific embodiments, changes and modifications are possible which do not depart from the spirit, scope, or contemplation of the teachings according to the invention herein. Such are deemed to come within the purview of the invention as claimed.

We claim:

1. A light control window covering comprising a first sheet of material, a second sheet of material disposed parallel to said first sheet, at least one of said sheets being porous, a plurality of strips of material each having opposed faces and opposed edge portions bordering each of said opposed faces, adhesive bonding means for bonding said strips along opposed edge portions to said sheets of material, said adhesive bonding means encapsulating the porous sheet of material and subsequently being treated to dull the appearance of the adhesive bonding means to remove any shine, the central portions of said strips forming vanes which, in a first closed position of said window covering are substantially planar and extend substantially parallel to the first and second sheets of material and, in the second open position of said window covering extend generally transverse to said first and second sheets.

2. A window covering according to claim 1, wherein adjacent vanes in said first closed portion overlap partially.

3. A window covering according to claim 1, wherein said adhesive bonding means includes adhesive material on opposed edge portions of said strips of material that contacts the strips and said first and second sheets and attaches them together.

4. A window covering according to claim 1, wherein said bonding means comprises an activated hot-melt adhesive.

5. A window covering according to claim 1, wherein at least one of said first and second sheets are composed of plastics material.

6. A window covering according to claim 1, wherein at least one of said first and second sheets are knitted, woven or nonwoven fabrics.

7. A window covering according to claim 1, wherein said first and second sheets have different physical appearances when said sheets are viewed along an axis perpendicular to the plane of the first and second sheet.

8. A window covering according to claim 1 or 7, wherein at least one of said first and second sheets is an open fabric having threads defining interstices therebetween.

9. A window covering according to claim 1, wherein said first and second sheets are each open sheer fabrics having threads defining interstices therebetween, the physical characteristics of the interstices of one sheet having a difference from those of the other sheet, when the sheets are in overlying relation in the window covering, whereby the appearance of a moire effect is avoided when light is viewed through both of the fabric sheets.

10. A window covering according to claim 9, wherein the difference in physical characteristics is at least one of size, shape and orientation.

11. A window covering according to claim 1, wherein the strips are formed of a fabric having threads defining interstices therebetween which present a different physical appearance from at least one of said sheer fabrics, whereby the appearance of a moire effect is avoided when said strips extend parallel to the first and second sheets in the first closed position of said window covering.

12. A window covering according to claim 1, wherein the portions of the strips between the bonded edge portions and the central portions form smoothly curving surfaces when the window covering is in its second open position.

13. A window covering according to claim 12, wherein the smoothly curving surfaces reversely curve.

14. A window covering according to claim 1, wherein each strip is attached by said bonding means to said first sheet and said second sheet in a manner tending to bias said first and second sheets together.

15. A window covering according to claim 14, wherein said strips reversely curve in said second open position.

16. A light control window covering according to claim 1 wherein said first sheet is composed of fibrous material.

17. A window covering according to claim 1, wherein said first and second sheets are relatively translucent.

18. A window covering according to claim 1 wherein the appearance of the adhesive bonding means is rendered dull by surface roughening the adhesive bonding means.

19. A window covering according to claim 1 wherein both sheets of material are porous.

20. A window covering according to claim 1 wherein said sheets of material are disposed in a parallel relationship.

21. A window covering according to claim 3 wherein the lines of bonding on adjacent strips are laterally displaced when the window covering is in the first closed position so that the central portions of the strips which form the vanes overlap.

22. A window covering according to claim 21, wherein the overlap is greater than two times the width of the bonded edge portion of a strip.

23. A window covering according to claim 21, wherein the strips are from about 1¼ inches wide to about 4 inches wide and the strips overlap from about ¼ inch to about ¾ inch.

24. A window covering according to claim 1 wherein the edge portions of said strips of materials are stiffened.

25. A window covering according to claim 1 wherein the lines of bonding are discontinuous.

26. A window covering according to claim 1 wherein each of said sheets is formed of a material selected from the group consisting of knitted, woven and non-woven fabrics and transparent plastic sheeting.

27. A window covering according to claim 1 wherein at least the central portion of each strip is opaque.

28. A window covering according to claim 27 wherein each said strip is composed of an opaque material.

29. A window covering according to claim 28 wherein the opaque material is stiff.

30. A window covering according to claim 1 wherein at least the central portion of a strip is made of a fabric having laminated thereto a stiffened opaque material.

31. A window covering according to claim 30 wherein a score-compressed hinge line is formed on each side of the stiffened material.

32. A window covering according to claim 1, wherein adjacent vanes in said first closed portion overlap partially.

33. A window covering according to claim 1, wherein said adhesive bonding means is comprised of adhesive material on opposed edge portions of said strips of material.

34. A window covering according to claim 1, wherein said bonding means comprises an activated hot-melt adhesive.

35. A window covering according to claim 1, wherein said first and second sheets are relatively translucent.

36. A light control window covering according to claim 1 wherein both sheets are porous and the adhesive on the remote faces of the sheets of material has a dull appearance.

37. A light control window covering according to claim 36 wherein the adhesive on the remote faces of the sheets of material has a texture.

38. A window covering according to claim 1, wherein said first and second sheets are each composed of knitted woven or nonwoven fabrics.

39. A window covering according to claim 1 or 35, wherein said first and second sheets have different physical appearances when said sheets are viewed along an axis perpendicular to the plane of the first and second sheet.

40. A window covering according to claim 1 or 35, wherein at least one of said first and second sheets is an open fabric having threads defining interstices therebetween.

41. A window covering according to claim 1 or 38, wherein said first and second sheets are each open sheer fabrics having threads defining interstices therebetween, the physical characteristics of the interstices of one sheet having a difference from those of the other sheet, when the sheets are in overlying relation in the window covering, whereby the appearance of a moire effect is avoided when light is viewed through both of the fabric sheets.

42. A window covering according to claim 41, wherein the difference in physical characteristics is at least one of size, shape and orientation.

43. A window covering according to claim 1, wherein the strips are formed of a fabric having threads defining interstices therebetween which present a different physical appearance from at least one of said sheer fabrics, whereby the appearance of a moire effect is avoided when said strips extend parallel to the first and second sheets in the first closed position of said window covering.

44. A window covering according to claim 1, wherein the central portions of the strips form smoothly curving surfaces when the window covering is in its second open position.

45. A window covering according to claim 1, wherein each strip is attached by said bonding means to said first sheet and said second sheet in a manner tending to bias said first and second sheets together.

46. A window covering according to claim 1 wherein sheets of material are composed of fibers.

47. A window covering according to claim 1 wherein the adhesive on the remote face of the at least one porous sheet is rendered dull by surface roughening.

48. A window covering according to claim 1 wherein both sheets of material are porous.

49. A window covering according to claim 1 wherein the bonded edge portions of the strips are laterally displaced when the window covering is in the first closed position so that the central portions of the strips which form the vanes overlap.

50. A window covering according to claim 49 wherein the overlap is greater than two times the width of the bonded edge portion of a strip.

51. A window covering according to claim 49 wherein the strips are from about 1¼ inch to about 4 inches wide and the overlap is from about ¼ inch to about ⅜ inch.

52. A window covering according to claim 1 wherein the edge portions of said strips of material are stiffened.

53. A light control window covering comprising a porous sheet of material, a set of elongated elements disposed parallel to said sheet, a plurality of strips of material each having opposed faces and opposed edge portions bordering each of said opposed faces, said strips being bonded with an adhesive along opposed edge portions to said sheet of material and said set of elongated elements, the adhesive encapsulating said porous sheet of material and being treated to dull the appearance of the adhesive to remove any shine, the central portions of said strips forming vanes which, in a first closed position of said window covering are substantially planar and extend substantially parallel to the sheet of material and set of elongated elements and, in a second open position of said window covering extend generally normal to said sheet and set of elongated elements.

54. A window covering according to claim 53, wherein adjacent vanes in said first closed position overlap partially.

55. A window covering according to claim 53, wherein said bonding is effected by an adhesive material that contacts the strips and said sheet and set of elongated elements and attaches them together.

56. A window covering according to claim 55, wherein said adhesive comprises an activated hot-melt adhesive.

57. A window covering according to claim 53, wherein said sheet is relatively translucent.

58. A window covering according to claim 57, wherein said sheet is composed of plastics material.

59. A-window covering according to claim 57, wherein said sheet is a knitted, woven or nonwoven sheer.

60. A window covering according to claim 57, wherein said sheet and set of elongated elements have different physical appearances when viewed along an axis perpendicular to the plane of the sheet.

61. A window covering according to claim 60, wherein said sheet is an open fabric having threads defining interstices therebetween.

62. A window covering according to claim 57, wherein said sheet and set of elongated elements are each open sheer fabrics having threads defining interstices therebetween, the physical characteristics of the interstices of one being different from the other, when they are in overlying relation in the window covering, whereby the appearance of a moire effect is avoided when light is viewed through both.

63. A window covering according to claim 62, wherein the difference in physical characteristics is at least one of size, shape and orientation.

64. A window covering according to claim 57, wherein the strips are formed of a fabric having threads defining interstices therebetween which present a different physical appearance from said sheet, whereby the appearance of a moire effect is avoided when said strips extend parallel to the sheet in the first closed position of said window covering.

65. A window covering according to claim 53, wherein the portions of the strips between the bonded edge portions and the central portions form smoothly curving surfaces when the window covering is in its second open position.

66. A window covering according to claim 65, wherein the smoothly curving surfaces reversely curve.

67. A window covering according to claim 53, wherein each strip is attached to said sheet and set of elongated elements in a manner tending to bias them together.

68. A window covering according to claim 67, wherein said strips reversely curve in said second open position.

69. A light control window covering comprising a first sheet of material, a second sheet of material disposed parallel to said first sheet, a plurality of elongated flexible strips of fabric material having longitudinal and cross directions, each strip having opposed faces and opposed edge portions bordering each of said opposed faces, said strips being bonded along opposed edge portions to said sheets of material, the central portions of said strips forming vanes which, in a first closed position of said window covering are substantially planar and extend substantially parallel to the first and second sheets of material and, in a second open position of said window covering extend generally normal to said first and second sheets, wherein said strips are more stiff in their longitudinal direction than in their cross direction.

70. A light control window covering according to claim 69 wherein the strips incorporate a binder.

71. A light control window covering according to claim 70 wherein the strips are impregnated with a binder.

72. A light control window covering according to claims 70 or 71 wherein the strips are stretched in their longitudinal direction and slack in their cross direction.

73. A window covering according to claim 69, wherein adjacent vanes in said first closed position overlap partially.

74. A window covering according to claim 69, wherein said bonding means is comprised of an adhesive material that contacts the strips and said first and second sheets and attaches them together.

75. A window covering according to claim 74, wherein said bonding means comprises an activated hot-melt adhesive.

76. A window covering according to claim 69, wherein said first and second sheets are relatively translucent.

77. A window covering according to claim 69, wherein at least one of said first and second sheets are composed of plastics material.

78. A window covering according to claim 69, wherein at least one of said first and second sheets are knitted, woven or nonwoven fabrics.

79. A window covering according to claim 69, wherein said first and second sheets have different physical appearances when said sheets are viewed along an axis perpendicular to the lane of the first and second sheet.

80. A window covering according to claim 69, wherein said first and second sheets are each open sheer fabrics having threads defining interstices therebetween, the physical characteristics of the interstices of one sheet having a difference from those of the other sheet, when the sheets are in overlying relation in window covering, whereby the appearance of a moire effect is avoided when light is viewed through both of the fabric sheets.

81. A window covering according to claim 69, wherein the strips are formed of a fabric having threads defining interstices therebetween which present a different physical appearance from at least one of said sheer fabrics, whereby the appearance of a moire effect is avoided when said strips extend substantially parallel to the first and second sheets in the first closed position of said window covering.

82. A window covering according to claim 69, wherein the portions of the strips between the bonded edge portions and the central portions form smoothly curving surfaces when the window covering is in its second open position.

83. A window covering according to claim 82, wherein the smoothly curving surfaces reversely curve.

84. A window covering according to claim 69, wherein each strip is attached by said bonding means to said first sheet and said second sheet in a manner tending to bias said first and second sheets together.

85. A window covering according to claim 84, wherein said strips reversely curve in said second open position.

* * * * *

UNITED STATES PATENT AND TRADEMARK OFFICE
CERTIFICATE OF CORRECTION

PATENT NO.   : 5,394,922
DATED        : March 7, 1995
INVENTOR(S)  : Colson et al.

It is certified that error appears in the above-indentified patent and that said Letters Patent is hereby corrected as shown below:

Title page, item [56] under Foreign Documents

"--294442--" should read -- 29442 --

Column 6, Line 23

"--effect the physical--" should read -- effect. The physical --

Column 6, Line 47

"--van--" should read -- vane --

Column 15, Line 25

"--394 The--" should read -- 394. The --

Column 22, Line 46

"--A-window--" should read -- A window --

Column 24, Line 18

"--lane--" should read -- plane --

Signed and Sealed this

Twenty-seventh Day of February, 1996

Attest:

BRUCE LEHMAN

*Attesting Officer*       *Commissioner of Patents and Trademarks*